(12) United States Patent
McCammon

(10) Patent No.: US 9,394,056 B2
(45) Date of Patent: Jul. 19, 2016

(54) AIR DUCT ASSEMBLY AND METHOD OF INSTALLING THE SAME

(71) Applicant: The Boeing Company, Seal Beach, CA (US)

(72) Inventor: William E. McCammon, Bothell, WA (US)

(73) Assignee: The Beoing Company, Chicago, IL (US)

( * ) Notice: Subject to any disclaimer, the term of this patent is extended or adjusted under 35 U.S.C. 154(b) by 604 days.

(21) Appl. No.: 13/844,969

(22) Filed: Mar. 16, 2013

(65) Prior Publication Data

US 2014/0273787 A1    Sep. 18, 2014

(51) Int. Cl.
| | |
|---|---|
| *B21D 53/92* | (2006.01) |
| *B64D 13/00* | (2006.01) |
| *F24F 13/02* | (2006.01) |
| *B64D 13/06* | (2006.01) |
| *B64C 1/06* | (2006.01) |

(52) U.S. Cl.
CPC .............. *B64D 13/00* (2013.01); *B21D 53/92* (2013.01); *B64C 1/066* (2013.01); *B64D 2013/0625* (2013.01); *F24F 13/0254* (2013.01); *Y02T 50/44* (2013.01); *Y02T 50/46* (2013.01); *Y02T 50/56* (2013.01); *Y10T 29/49622* (2015.01)

(58) Field of Classification Search
None
See application file for complete search history.

(56) References Cited

U.S. PATENT DOCUMENTS

| | | | | |
|---|---|---|---|---|
| 832,247 | A | | 10/1906 | Edwards |
| 2,835,186 | A | * | 5/1958 | Goldsmith ............... F24D 5/02 165/53 |
| 2,863,606 | A | * | 12/1958 | Tatsch .................... F16L 41/18 138/163 |
| 3,088,392 | A | * | 5/1963 | Egan ....................... E04B 9/02 454/298 |

(Continued)

FOREIGN PATENT DOCUMENTS

DE    29712740U1 U1    11/1997

OTHER PUBLICATIONS

PCT International Preliminary Report on Patentability and Written Opinion of the International Searching Authority for Counterpart International Application No. PCT/US2014/016431, Issued Sep. 22, 2015, Applicant The Boeing Company, 7 pages.

*Primary Examiner* — Gregory Huson
*Assistant Examiner* — Eric Gorman

(57) ABSTRACT

There is provided an air duct assembly. The air duct assembly has a deformable duct preform having securing portions formed along opposing longitudinal edges. Each securing portion has a flange portion and a radius portion. The air duct assembly further has a panel structure having a pair of longitudinal base members mounted thereon in an opposed, spaced, predetermined relationship. Each longitudinal base member has a retaining element along a longitudinal edge of the longitudinal base member. Each retaining element is preconfigured to engage the flange portion and the radius portion of each securing portion to attach the deformable duct preform to the longitudinal base members and to form an air-leak resistant seal. The deformable duct preform is adaptable in a cross-sectional profile in relation to variations in attachment of the deformable duct preform to the longitudinal base members.

24 Claims, 15 Drawing Sheets

(56) References Cited

U.S. PATENT DOCUMENTS

| | | | |
|---|---|---|---|
| 3,227,063 A * | 1/1966 | Lambert | F24F 13/072 454/299 |
| 3,331,305 A | 7/1967 | Oneson | |
| 3,690,243 A * | 9/1972 | Lambert | F24F 13/072 454/303 |
| 3,815,486 A | 6/1974 | Morrison | |
| 3,895,177 A * | 7/1975 | Muslin | H02G 3/0616 138/109 |
| 3,913,470 A * | 10/1975 | Cullen | B08B 15/005 137/580 |
| 3,952,492 A * | 4/1976 | Miyazaki | D01H 11/006 57/301 |
| 4,224,111 A * | 9/1980 | Rozas | C10B 33/003 202/255 |
| 4,566,724 A * | 1/1986 | Arnoldt | F24F 13/0209 285/364 |
| 4,742,760 A | 5/1988 | Horstman et al. | |
| 4,819,548 A | 4/1989 | Horstman | |
| 5,033,361 A * | 7/1991 | Moszkowski | F24D 3/165 165/56 |
| 5,314,212 A * | 5/1994 | Sanders | F16L 41/082 285/189 |
| 5,383,815 A | 1/1995 | Kiesel et al. | |
| 5,518,277 A * | 5/1996 | Sanders | F16L 41/082 285/189 |
| 5,556,332 A * | 9/1996 | Schumacher | B64D 11/00 454/64 |
| 5,671,778 A * | 9/1997 | Sakuragi | B29C 63/0013 138/125 |
| 5,904,617 A * | 5/1999 | Dausch | B29C 33/44 264/318 |
| 5,964,194 A * | 10/1999 | Pontopiddan | F02M 35/10039 123/184.42 |
| 6,217,438 B1 * | 4/2001 | Dausch | B60H 1/0055 264/318 |
| 6,397,886 B1 * | 6/2002 | Schopferer | F16L 55/26 137/580 |
| 7,891,671 B2 * | 2/2011 | Allford | F16J 15/027 137/15.1 |
| 8,967,540 B2 * | 3/2015 | Lacombe | B64C 1/061 244/119 |
| 2004/0261880 A1 | 12/2004 | Kleinsasser et al. | |
| 2005/0211847 A1 | 9/2005 | Pattie et al. | |
| 2005/0224125 A1 * | 10/2005 | Kajino | F16L 9/003 138/119 |

* cited by examiner

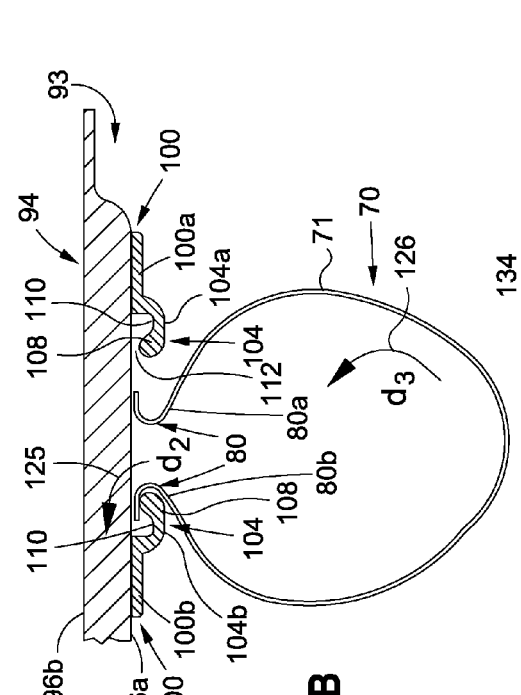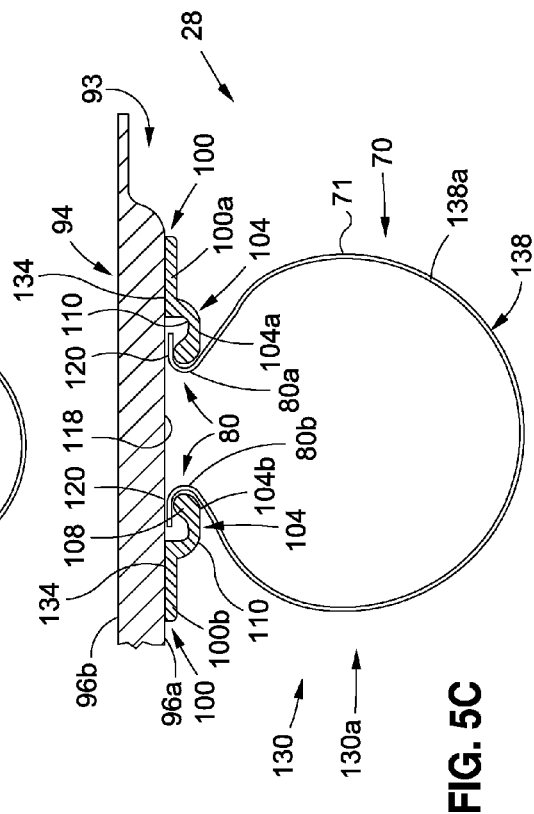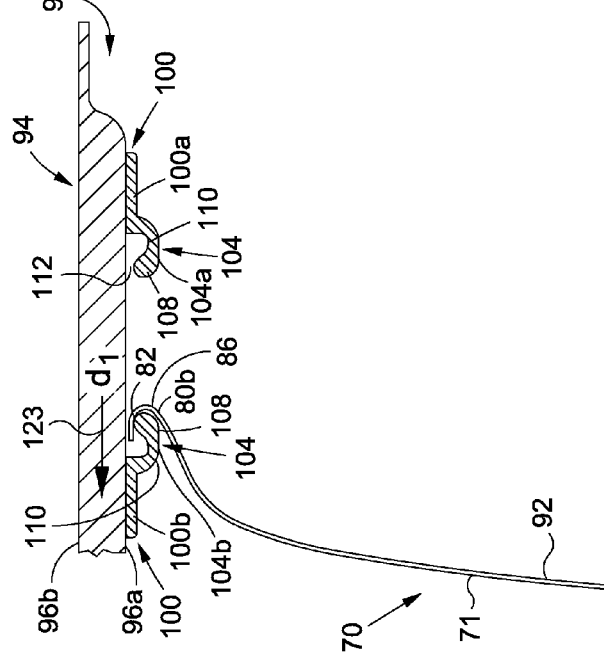
FIG. 5B
FIG. 5C
FIG. 5A

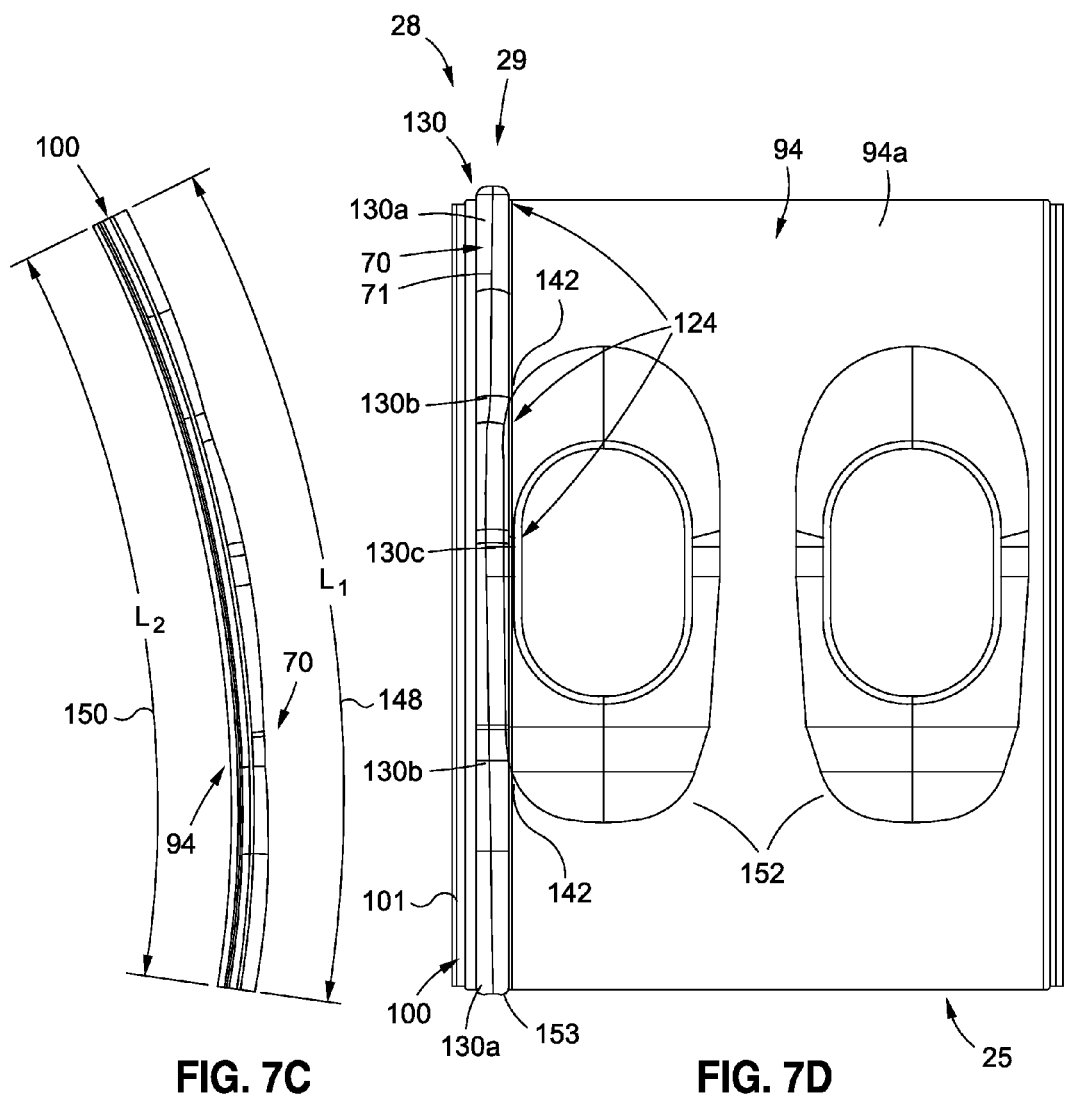

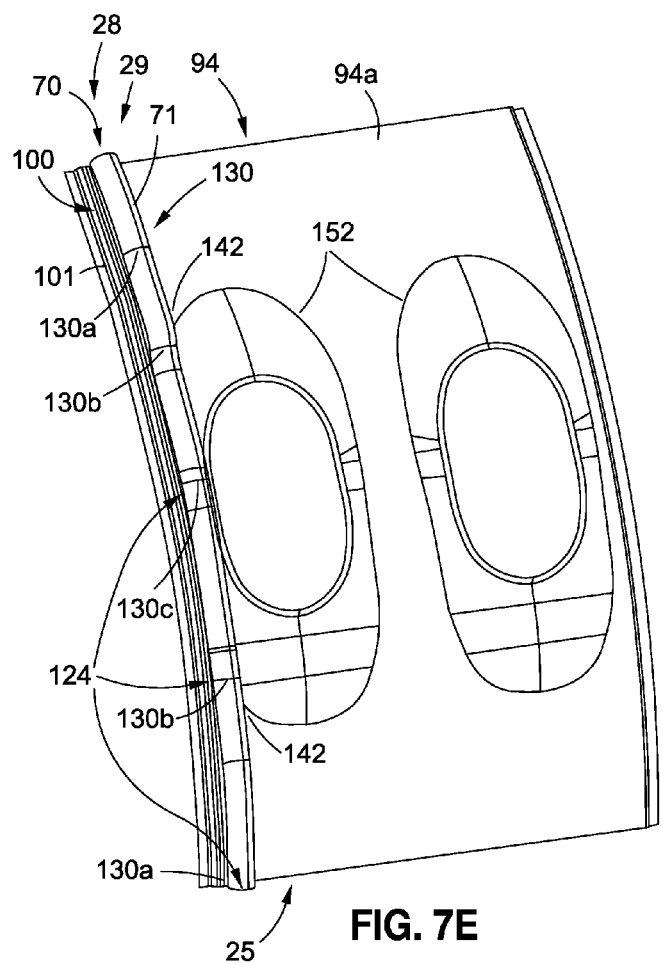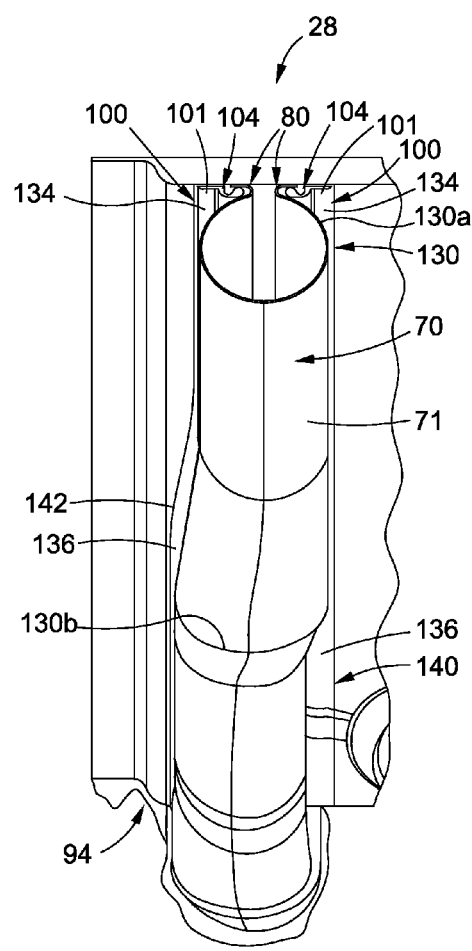
FIG. 7E
FIG. 7F

AIR DUCT ASSEMBLY AND METHOD OF INSTALLING THE SAME

BACKGROUND

1) Field of the Disclosure

The disclosure relates generally to duct assemblies and methods, and more specifically, to air duct assemblies and methods for environmental control systems that may be rapidly installed and removed in air vehicles and other vehicles and structures.

2) Description of Related Art

Ducts for transporting air and other liquids or gases are commonly used in various applications. For example, cylindrical or tubular ducts used in environmental control systems (ECS) in air vehicles, such as aircraft and rotorcraft, may be used to transport air to an interior passenger cabin and to interior cargo compartments in the air vehicle. Such cylindrical or tubular air ducts are generally connected to an air source and typically have one or more nozzles for distributing the air throughout the interior passenger cabin and cargo compartments.

Conditioned air from the ECS packs below a wing of an air vehicle must be transported to plenums above passenger cabin lining panels for distribution. Typically, this has been accomplished by using aircraft-mounted rigid round ducts, also known as "riser ducts". However, such riser ducts may be very large in size and their use may result in passenger windows being removed from one or more "frame bays" they occupy, as they allow no room for the window structure.

Moreover, known custom-made ducts with deformed shapes exist that may be used in environmental control systems in air vehicles. However, such known custom-made ducts may require special tooling and production processes for mounting and installation, due to trapped volume shapes and complex construction. Such special tooling and production processes may result in expensive material and production costs and increased time and labor to mount and install the ducts.

In addition, known cylindrical or tubular ducts used in environmental control systems in air vehicles may be mounted to or installed in the airframe of the air vehicle and may typically require various support assemblies for such mounting and installation. However, such support assemblies may consist of a substantial number of parts or may be sized for mounting only specific ducts of certain shapes and sizes. This may result in increased material costs, increased installation times, and increased labor costs associated with such mounting and installation.

Further, known closed curve or closed shape ducts typically duplicate the "wall" of a panel structure, lining, or surface that they are mounted to. This may waste valuable integration volume and may increase an overall weight of a structure to which the ducts are being installed in, such as an air vehicle or other vehicle or structure. Increased weight of an air vehicle, for example, may result in increased fuel consumption, which, in turn, may result in increased fuel costs.

Accordingly, there is a need in the art for improved air duct assemblies and methods of installing such air duct assemblies that provide advantages over known assemblies and methods.

SUMMARY

This need for improved air duct assemblies and methods for installing such air duct assemblies is satisfied. As discussed in the below detailed description, embodiments of the improved air duct assemblies and methods of installing such air duct assemblies may provide significant advantages over known assemblies and methods.

In an embodiment of the disclosure, there is provided an air duct assembly. The air duct assembly comprises a deformable duct preform having securing portions formed along opposing longitudinal edges of the deformable duct preform. Each securing portion has a flange portion and a radius portion. The air duct assembly further comprises a panel structure having a pair of longitudinal base members mounted thereon in an opposed, spaced, predetermined relationship. Each longitudinal base member has a retaining element along a longitudinal edge of the longitudinal base member. Each retaining element is pre-configured to engage the flange portion and the radius portion of each securing portion to attach the deformable duct preform to the longitudinal base members and to form an air-leak resistant seal. The deformable duct preform is adaptable in a cross-sectional profile in relation to variations in attachment of the deformable duct preform to the longitudinal base members.

In another embodiment of the disclosure, there is provided an air vehicle. The air vehicle comprises an airframe. The air vehicle further comprises a plurality of environmental control system conditioned air duct assemblies integrated within the airframe. Each air duct assembly comprises a deformable duct sheet having securing portions formed along opposing longitudinal edges of the deformable duct sheet. Each securing portion has a flange portion and a radius portion. Each air duct assembly further comprises a panel structure having a pair of longitudinal tracks mounted thereon in an opposed, spaced, predetermined relationship. Each longitudinal track has a retaining element along a longitudinal edge of the longitudinal track. Each retaining element is pre-configured to engage the flange portion and the radius portion of each securing portion to attach the deformable duct preform to the longitudinal base members and to form an air-leak resistant seal. The deformable duct preform is adaptable in a cross-sectional profile in relation to variations in attachment of the deformable duct preform to the longitudinal base members.

In another embodiment of the disclosure, there is provided method of installing an air duct assembly in a structure. The method comprises the step of forming a deformable duct preform having securing portions formed along opposing longitudinal edges. Each securing portion has a flange portion and a radius portion. The method further comprises the step of mounting onto a panel structure a pair of longitudinal base members in an opposed, spaced, predetermined relationship. Each longitudinal base member has a retaining element along a longitudinal edge. Each retaining element is pre-configured to engage the flange portion and the radius portion of each securing portion. The method further comprises the step of assembling the deformable duct preform about and within the retaining elements of the longitudinal base members. The method further comprises the step of deforming the deformable duct preform in a lateral direction about and within the retaining elements of the longitudinal base members to move the flange portions toward each other. The method further comprises the step of releasing and relaxing the deformable duct preform, causing the flange portion and the radius portion to conform to the opposed, spaced, predetermined relationship of the longitudinal base members to obtain an air duct assembly having an installed configuration. The air duct assembly forms an air-leak resistant seal. The method further comprises the step of installing the air duct assembly in a structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 5A is an illustration of a cross-sectional side view of an embodiment of a deformable duct preform partially installed in a mounting base that may be used in an embodiment of an air duct assembly of the disclosure;

FIG. 5B is an illustration of a cross-sectional side view of the deformable duct preform of FIG. 5A deformed in a lateral bending direction;

FIG. 5C is an illustration of a cross-sectional side view of an embodiment of an air duct assembly in an in-plane baseline installed configuration;

FIG. 7C is an illustration of an end elevation view of the air duct assembly of FIG. 7B showing a length of a deformable duct preform and a length of a longitudinal base member;

FIG. 7D is an illustration of a side elevation view of an embodiment of an air duct assembly installed adjacent to a window in a lining panel;

FIG. 7E is an illustration of a side perspective view of the air duct assembly of FIG. 7D;

FIG. 7F is an illustration of an enlarged, perspective, partial top view of the air duct assembly of FIG. 7E;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
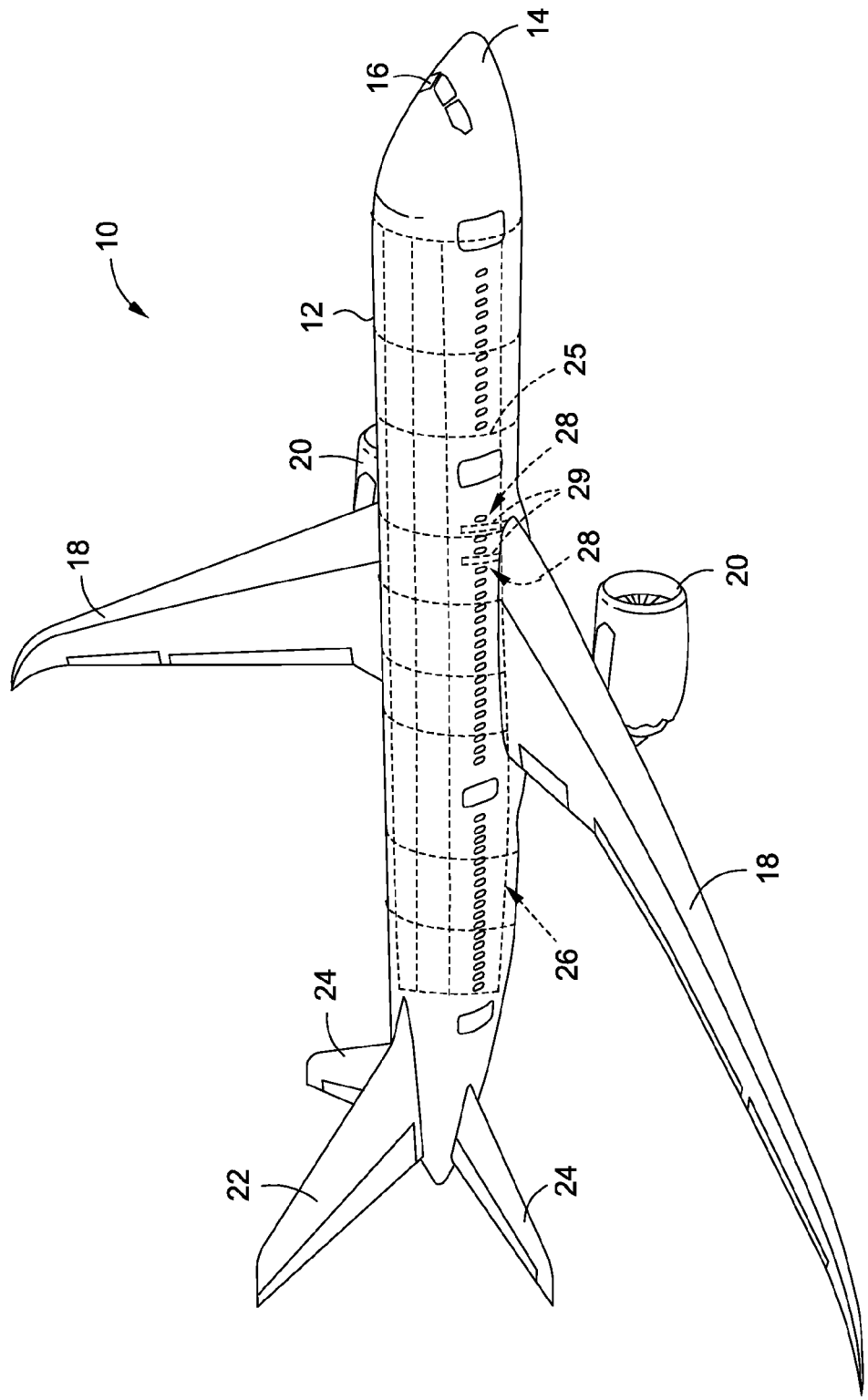
FIG. 1 is an illustration of a perspective view of an air vehicle that may incorporate one or more embodiments of an air duct assembly of the disclosure.

Now referring to the Figures, FIG. 1 is an illustration of a perspective view of an air vehicle 10 that may incorporate one or more embodiments of an air duct assembly 28, such as, for example, an environmental control system conditioned-air duct assembly 29, installed in a structure 25, such as an airframe 26. As shown in FIG. 1, the air vehicle 10, such as an aircraft, comprises a fuselage 12, a nose 14, a cockpit 16, wings 18, one or more propulsion units 20, a vertical tail portion 22, and horizontal tail portions 24. The air duct assembly 28, such as, for example, the environmental control system conditioned-air duct assembly 29, is preferably installed in a structure 25 for an airframe 26. Although two representative air duct assemblies 28, such as, for example, the environmental control system conditioned-air duct assemblies 29, are shown in FIG. 1, numerous air duct assemblies 28 may be installed in the structure 25, such as the airframe 26.

Although the air vehicle 10 shown in FIG. 1 is generally representative of a commercial passenger aircraft having one or more air duct assemblies 28, the teachings of the disclosed embodiments may be applied to other passenger aircraft, cargo aircraft, military aircraft, rotorcraft, and other types of aircraft or aerial vehicles, as well as well as boats and other watercraft, trains, automobiles, trucks, buses, or other suitable structures that may use an environmental control system and may have the need for one or more air duct assemblies 28 of the disclosure.

Figure 2:
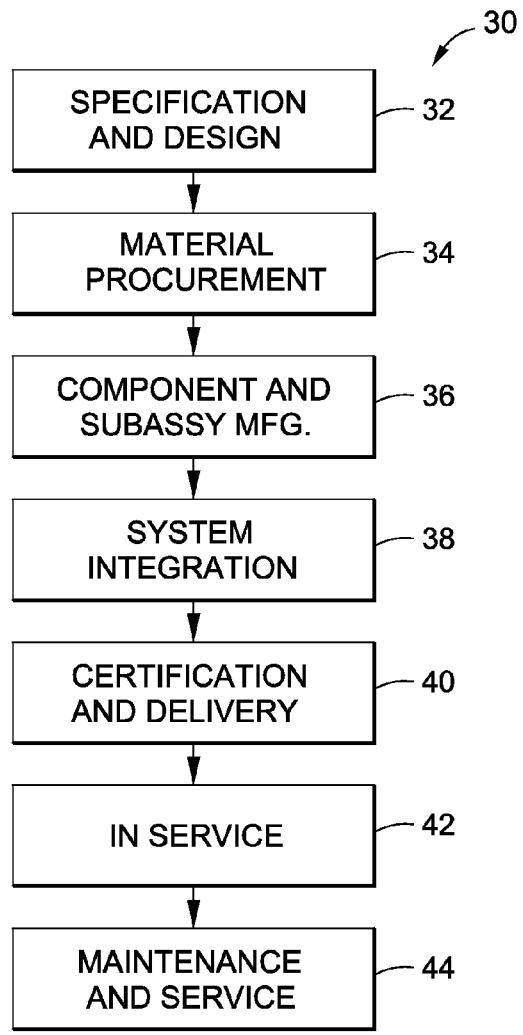
FIG. 2 is an illustration of a flow diagram of an aircraft manufacturing and service method.
Figure 3:
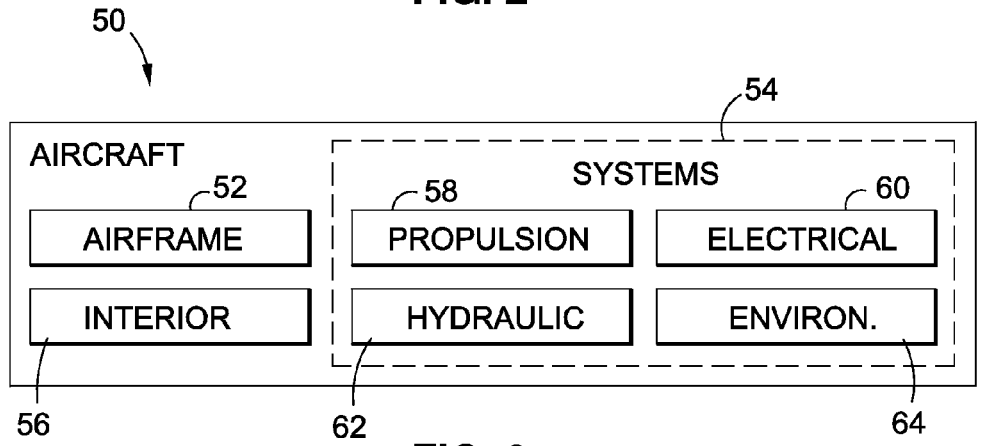
FIG. 3 is an illustration of a block diagram of an aircraft.

FIG. 2 is an illustration of a flow diagram of an aircraft manufacturing and service method 30. FIG. 3 is an illustration of a block diagram of an aircraft 50. Referring to FIGS. 2-3, embodiments of the disclosure may be described in the context of the aircraft manufacturing and service method 30 as shown in FIG. 2 and the aircraft 50 as shown in FIG. 3. During pre-production, the aircraft manufacturing and service method 30 may include specification and design 32 of the aircraft 50 and material procurement 34. During the aircraft manufacturing and service method 30, component and subassembly manufacturing 36 and system integration 38 of the aircraft 50 takes place. Thereafter, the aircraft 50 may go through certification and delivery 40 in order to be placed in service 42. While in service 42, the aircraft 50 may be scheduled for routine maintenance and service 44 (which may also include modification, reconfiguration, refurbishment, and other suitable services).

Each of the processes of the aircraft manufacturing and service method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 50 produced by the aircraft manufacturing and service method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and systems embodied herein may be employed during any one or more of the stages of the production and service method 30. For example, components or subassemblies corresponding to component and subassembly manufacturing 36 may be fabricated or manufactured in a manner similar to components or subassemblies produced while the aircraft 50 is in service. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service, for example and without limitation, to maintenance and service 44.

Figure 4A:
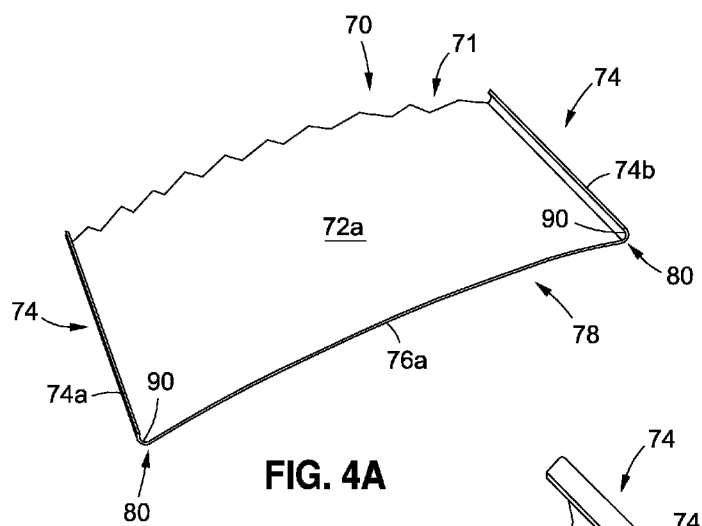
FIG. 4A is an illustration of a partial perspective top view of an embodiment of a deformable duct preform that may be used in an embodiment of an air duct assembly of the disclosure.
Figure 4B:
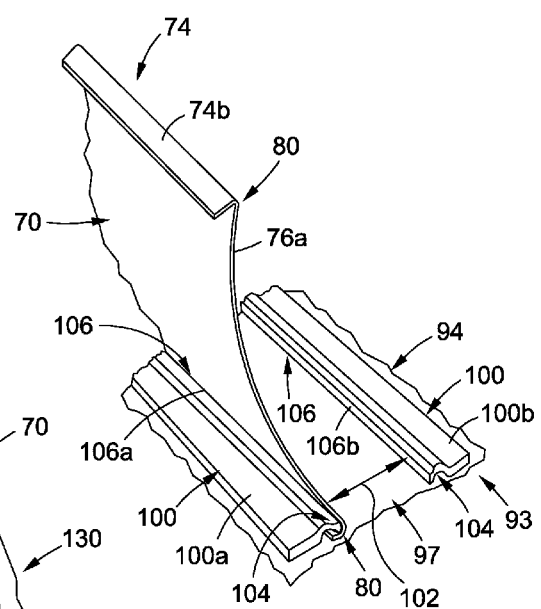
FIG. 4B is an illustration of a partial perspective top view of the deformable duct preform of FIG. 4A partially installed in a mounting base that may be used in an embodiment of an air duct assembly of the disclosure.
Figure 4C:
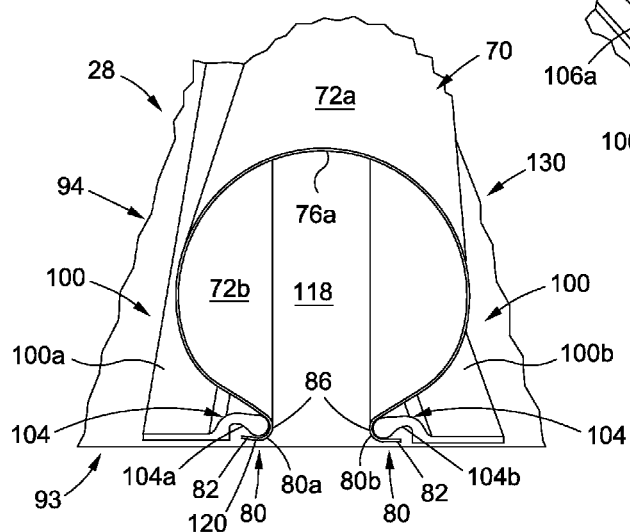
FIG. 4C is an illustration of a perspective end view of an embodiment of an air duct assembly of the disclosure.

In an embodiment of the disclosure, there is provided an air duct assembly 28 (see FIG. 4C). Preferably, the air duct assembly 28 is an environmental control system conditioned-air duct assembly 29 (see FIG. 7D). The air duct assembly 28 preferably comprises a deformable duct preform 70 (see FIG. 4A). FIG. 4A is an illustration of a partial perspective top view of an embodiment of a deformable duct preform 70 that may be used in an embodiment of an air duct assembly 28 of the disclosure. The deformable duct preform 70 is preferably in the form of a sheet 71 (see FIG. 4A), is preferably thin-walled, and is preferably made of a semi-rigid, lightweight material consisting of a thermoplastic material, a thermoset material, a fiberglass material in a cured phenolic resin, or another suitable material. The deformable duct preform 70 may be made by known manufacturing processes, such as known die-extrusion processes (preferably for deformable duct preforms 70 having a linear longitudinal shape 128 (see FIG. 8A)), known heat stretch-formed or vacuum-formed processes (preferably for deformable duct preforms 70 having a non-linear longitudinal shape 142 (see FIG. 7E)), or another suitable known manufacturing process.

Figure 7A:
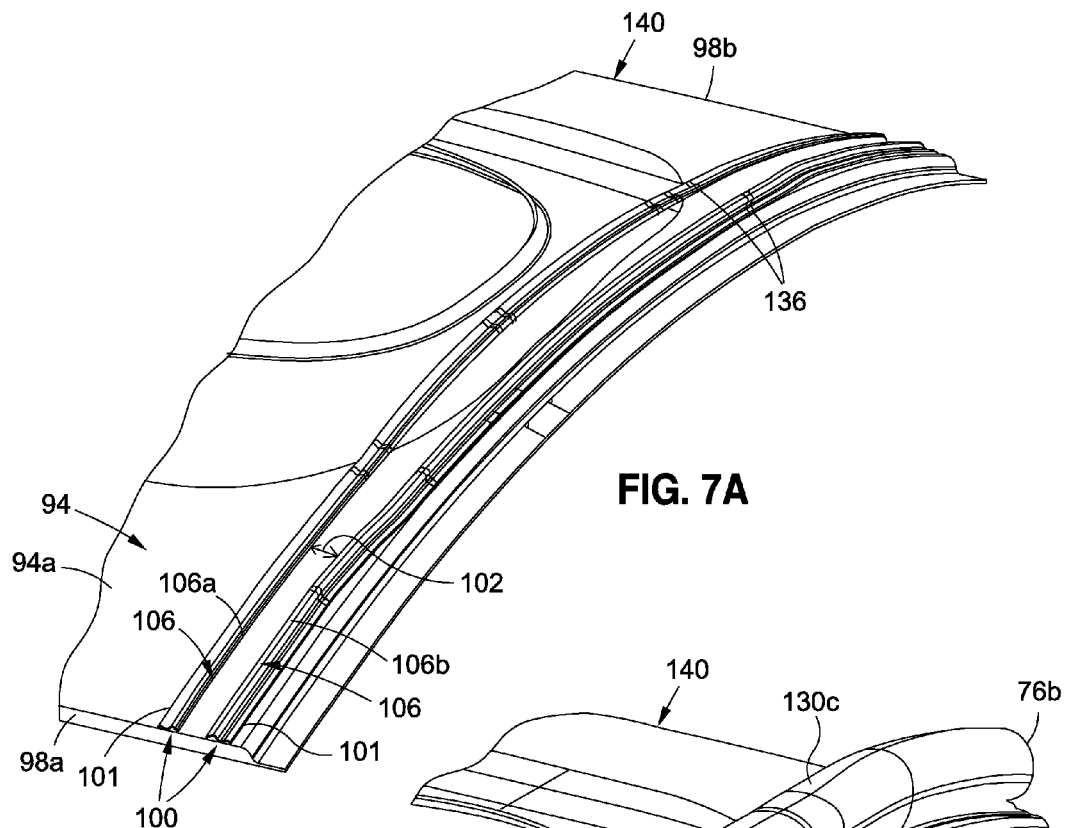
FIG. 7A is an illustration of a perspective side view of an embodiment of a pair of longitudinal base members mounted to a lining panel having a complex surface shape.
Figure 7B:
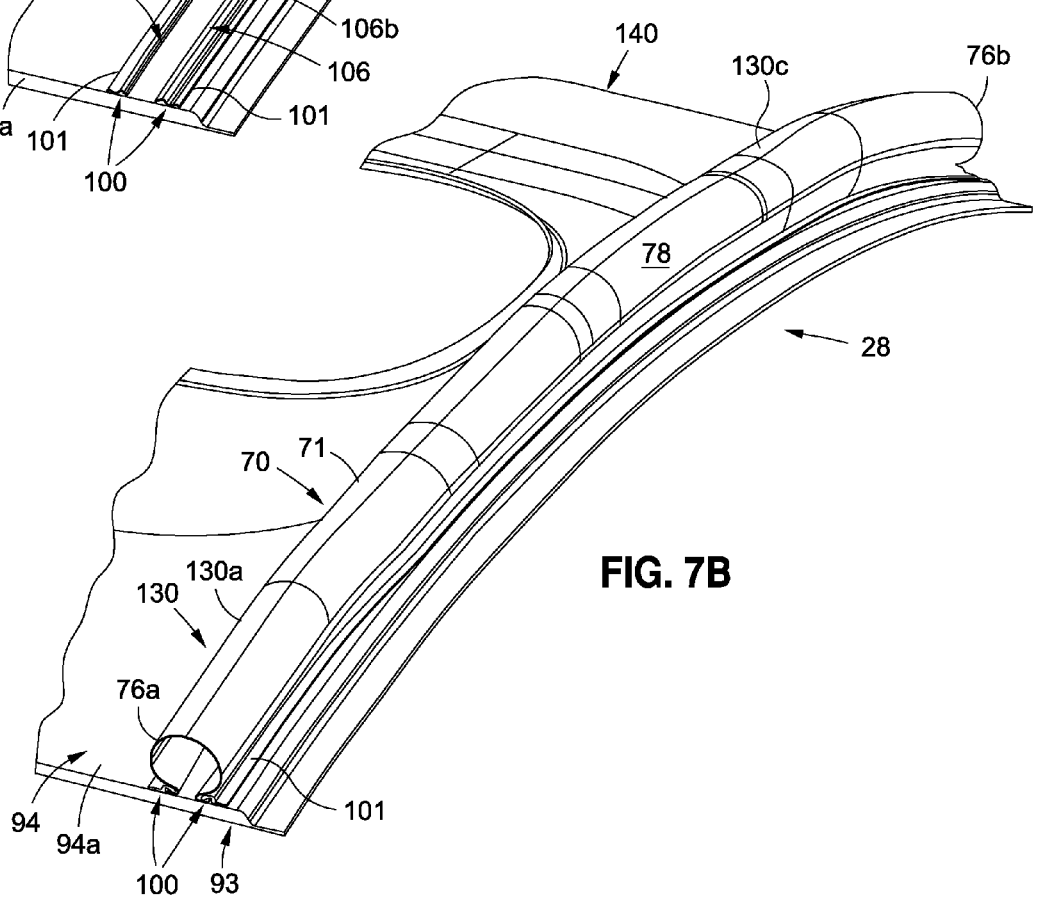
FIG. 7B is an illustration of a perspective side view of an embodiment of an air duct assembly of the disclosure incorporating the pair of longitudinal base members of FIG. 7A.

The deformable duct preform 70 preferably comprises a first side 72a (see FIG. 4A), a second side 72b (see FIG. 4C), a first end 76a (see FIG. 4A), and a second end 76b (see FIG. 7B). As shown in FIG. 4A, the deformable duct preform 70 further comprises opposing longitudinal edges 74, such as in the form of a first longitudinal edge 74a and a second longitudinal edge 74b. The deformable duct preform 70 further comprises a body portion 78 (see FIG. 4A). The body portion 78 formed between the opposing longitudinal edges 74 may be substantially flat in shape prior to deformation and installation of the deformable duct preform 70.

As shown in FIG. 4A, the deformable duct preform 70 further comprises securing portions 80 formed along the opposing longitudinal edges 74 of the deformable duct preform 70. The securing portions 80 preferably comprise a first securing portion 80a (see FIG. 4C) and a second securing portion 80b (see FIG. 4C). Each securing portion 80 preferably has a hook-shaped configuration 90 (see FIG. 4A). As shown in FIG. 4C, each securing portion 80 comprises a flange portion 82 and a radius portion 86. As shown in FIG. 5A, the flange portion 82 has a first side 84a and a second side 84b, and the radius portion 86 has a first side 88a and a second side 88b.

The air duct assembly 28 further comprises a mounting base 93 (see FIG. 4B). FIG. 4B is an illustration of a partial perspective top view of the deformable duct preform 70 of FIG. 4A, partially installed in a mounting base 93 that may be used in an embodiment of the air duct assembly 28 (see FIG. 4C) of the disclosure. As shown in FIG. 4B, the mounting base 93 comprises a panel structure 94. The panel structure 94 preferably comprises a lining panel 94a (see FIGS. 6A, 7D), a ceiling panel 94b (see FIG. 8A), or another suitable panel structure, for use in an air vehicle 10 (see FIG. 1), such as an aircraft, a rotorcraft, or another suitable air vehicle, for use in a watercraft, for use in a train, or for use in another suitable vehicle or structure. The panel structure 94 has a first surface 96a (see FIGS. 5A-5C), a second surface 96b (see FIGS. 5A-5C), a first end 98a (see FIG. 6A), and a second end 98b (see FIG. 6A).

As further shown in FIG. 4B, the panel structure 94 has a surface portion 97 that preferably forms a sealing wall 118 (see FIG. 4C) of the deformable duct preform 70, when the deformable duct preform 70 is fully installed and mounted to the mounting base 93 (see FIG. 4B) to obtain the air duct assembly 28 (see FIG. 4C). By use of the installed surface portion 97 of the panel structure 94 as the sealing wall 118, or "fourth wall", of the deformable duct preform 70, an overall weight of the air duct assembly 28 may be reduced as compared to an existing air duct assembly having a closed-curve air duct. Thus, a key weight-saving feature of the air duct assembly 28 relies on the existing surface portion 97 (see FIG. 4B) of the panel structure 94 (see FIG. 4B) as its sealing wall 118 (see FIG. 4C), or "fourth wall", and the deformable duct preform 70 itself does not duplicate the surface portion 97, as an existing or known round, closed-curve air duct would. In addition to weight savings, the air duct assembly 28 preferably has a reduced overall height, as compared to an existing or known round, closed-curve air duct, due to no duplication of the surface portion 97 (see FIG. 4B) with the air duct assembly 28 disclosed herein, while the air duct assembly 28 may still maintain a substantially equivalent air flow volume capacity, as compared to an existing or known round, closed-curve air duct. Having a reduced overall height may facilitate the routing of the air duct assembly 28 through challenging integration areas.

As shown in FIG. 4B, the mounting base 93 further comprises a pair of longitudinal base members 100 mounted on the panel structure 94 in an opposed, spaced predetermined relationship 102. The retention of the deformable duct preform 70 to the panel structure 94 is provided by the pair of longitudinal base members 100. As further shown in FIG. 4B, the longitudinal base members 100 may be in the form of a first longitudinal base member 100a and a second longitudinal base member 100b. The longitudinal base members 100 may comprise longitudinal tracks 101 (see FIG. 7A). As shown in FIG. 7C, the deformable duct preform 70 preferably has a length 148 (L1) that is preferably equal to or substantially equal to a length 150 (L2) of the pair of longitudinal base members 100. FIG. 7C is an illustration of an end elevation view of the air duct assembly 28 of FIG. 7B showing the length 148 (L1) of the deformable duct preform 70, as compared to the length 150 (L2) of the longitudinal base member 100. The longitudinal base members 100 are preferably spaced such that the deformable duct preform 70 may be forced into a desired shape as discussed below, and some pre-forming of the deformable duct preform 70 may assist with this. The longitudinal base members 100 may be mounted to the panel structure 94 via known bonding materials or processes and/or via known mechanical devices or known mechanical processes.

As further shown in FIG. 4B, each longitudinal base member 100 has a retaining element 104 formed along or added along a longitudinal edge 106 of the longitudinal base member 100. As shown in FIG. 4C, the retaining elements 104 may be in the form of a first retaining element 104a and a second retaining element 104b. As shown in FIG. 4B, the longitudinal edges 106 may be in the form of a first longitudinal edge 106a and a second longitudinal edge 106b. The longitudinal base members 100 may be made of thermoplastic materials or other suitable materials, and may be manufactured by known manufacturing processes, such as known extrusion processes, known injection molding processes, or another suitable known manufacturing process.

The retaining element 104 comprises a receiving end portion 108 (see FIGS. 5A-5F). The receiving end portion 108 preferably comprises a bulb-shaped pivot portion 109 (see FIG. 5F). The receiving end portion 108 along each retaining element 104 preferably matches the length 150 (L2) (see FIG. 7C) of the pair of longitudinal base members 100 (see FIG. 7C), and in turn, matches the length 148 (L1) (see FIG. 7C) of the deformable duct preform 70.

Figure 5D:
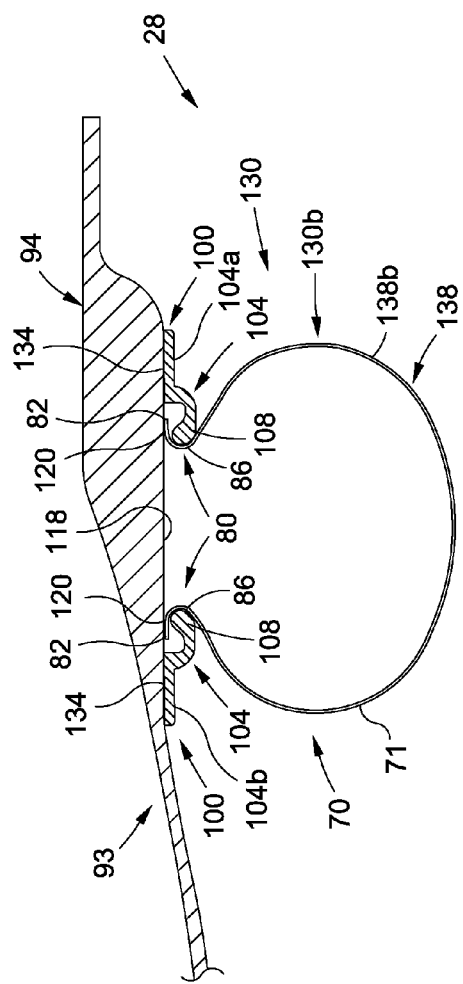
FIG. 5D is an illustration of a cross-sectional side view of an embodiment of an air duct assembly in an in-plane displaced installed configuration.
Figure 5E:
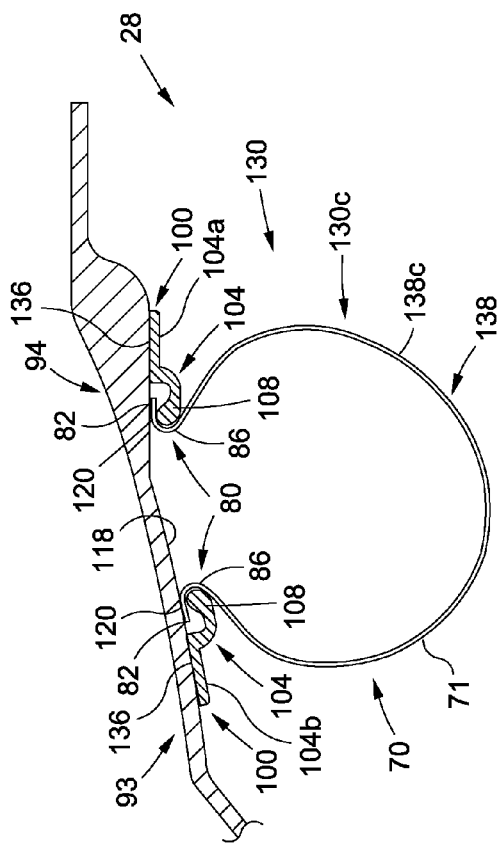
FIG. 5E is an illustration of a cross-sectional side view of an embodiment of an air duct assembly in an out-of-plane displaced installed configuration.
Figure 5F:
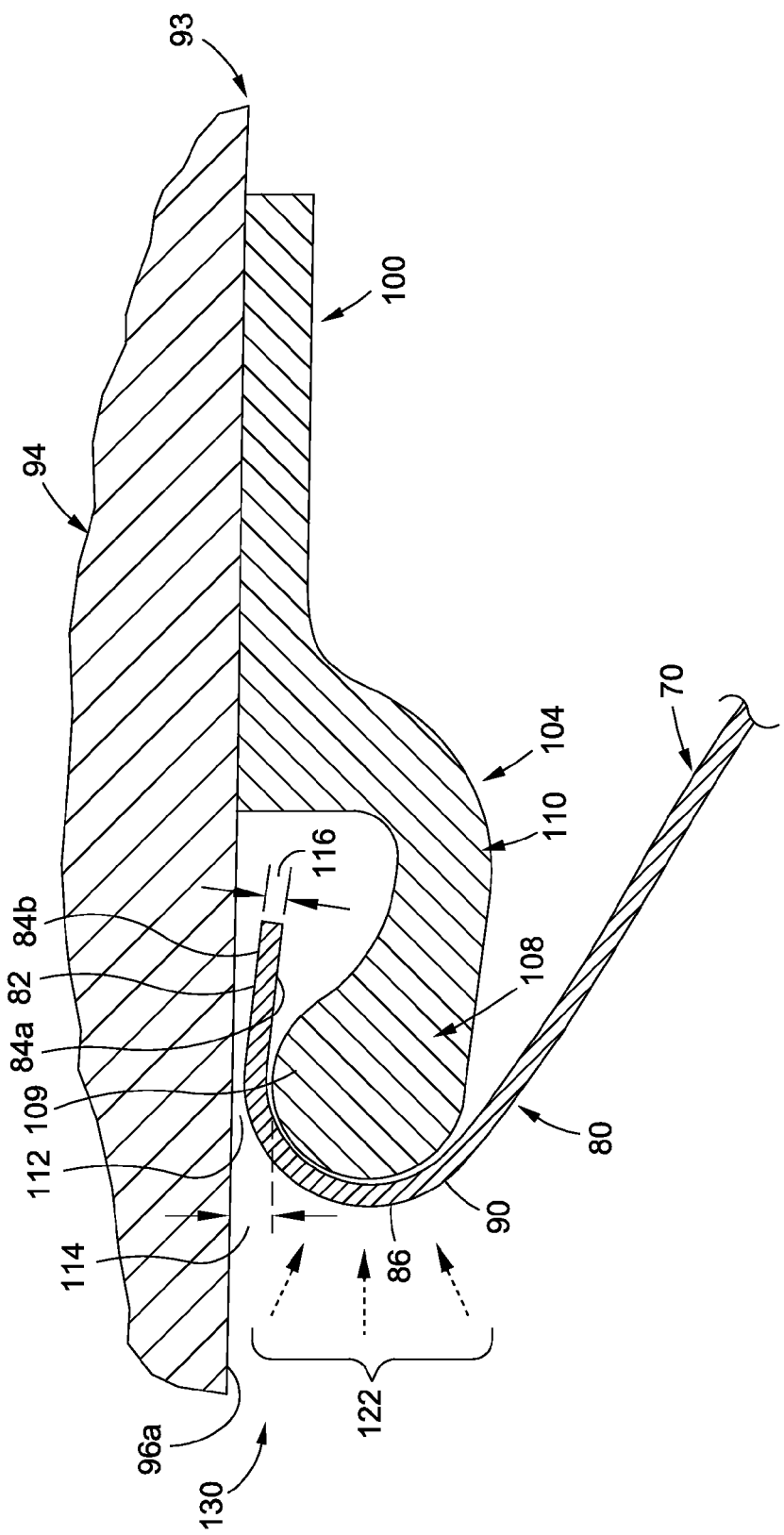
FIG. 5F is an illustration of an enlarged cross-sectional partial side view of a securing portion of a deformable duct preform engaged with a retaining element of a longitudinal base member.

As shown in FIG. 5F, the receiving end portion 108 is preferably offset slightly from the first surface 96a of the panel structure 94, such that the flange portion 82 of the securing portion 80 is allowed to pass by the receiving end portion 108. As further shown in FIG. 5F, the receiving end portion 108 preferably forms a gap 112 with the first surface 96a of the panel structure 94.

The retaining element 104 further comprises an arm portion 110 (see FIG. 5A) supporting the receiving end portion 108 (see FIG. 5A). The arm portion 110 may have an angled goose-neck shape or another suitable shape and is preferably configured to allow the flange portion 82 (see FIG. 5A) and the radius portion 86 (see FIG. 5A) of the securing portion 80 (see FIG. 5A) to rotate about the receiving end portion 108 without interference when the deformable duct preform 70 is attached to the longitudinal base members 100. In the installed configuration 130 (see FIG. 4C), each retaining element 104 is preferably pre-configured to engage the flange portion 82 and the radius portion 86 of each securing portion 80 to attach the deformable duct preform 70 to the longitudinal base members 100 and to form an air-leak resistant seal 120 (see FIGS. 4C, 5C).

FIG. 4C is an illustration of a perspective end view of an embodiment of the air duct assembly 28 of the disclosure. As shown in FIG. 4C, the deformable duct preform 70 is shown engaged with or attached to the longitudinal base members 100 mounted on the panel structure 94 of the mounting base 93 to obtain the air duct assembly 28. As further shown in FIG. 4C, the flange portion 82 and the radius portion 86 of the first securing portion 80 are positively engaged with and retained by the first retaining element 104a of the first longitudinal base member 100a, and the flange portion 82 and the radius portion 86 of the second securing portion 80b are positively engaged with and retained by the second retaining element 104b of the second longitudinal base member 100b, thereby securing the deformable duct preform 70 in place in the longitudinal base members 100 of the mounting base 93 and forming an air-leak resistant seal 120. As further shown in FIG. 4C, each flange portion 82 of each securing portion 80 is preferably substantially parallel to the panel structure 94, when the deformable duct preform 70 is attached to the longitudinal base members 100 of the mounting base 93.

FIGS. 5A-5E show the installation of embodiments of the air duct assembly 28 (see FIG. 5C) of the disclosure and various installed configurations 130 (see FIGS. 5C-5E) of the air duct assembly 28. FIGS. 5A-5E show the deformable duct preform 70, such as in the form of sheet 71, having the securing portions 80, each securing portion 80 having the flange portion 82 and the radius portion 86, and being installed in or mounted to the mounting base 93. As shown in FIGS. 5A-5E, the mounting base 93 comprises the panel structure 94 having a first surface 96a and a second surface 96b, and comprising the longitudinal base members 100, such as in the form of first longitudinal base member 100a and second longitudinal base member 100b, mounted to the first surface 96a of the panel structure 94. As shown in FIGS. 5A-5E, the longitudinal base members 100 have retaining elements 104, such as in the form of first retaining element 104a and second retaining element 104b, where each retaining element 104 comprises a receiving end portion 108 and an arm portion 110.

FIG. 5A is an illustration of a cross-sectional side view of an embodiment of the deformable duct preform 70 partially installed in the mounting base 93. As shown in FIG. 5A, the flange portion 82 of the second securing portion 80b of the deformable duct preform 70 is moved in a lateral direction ($d_1$) 123 or slipped under the receiving end portion 108 of the second retaining element 104b, and between the receiving end portion 108 of the second retaining element 104b and the first surface 96a of the panel structure 94. As further shown in FIG. 5A, the flange portion 82 is preferably substantially parallel to the first surface 96a of the panel structure 94 to facilitate back and forth movement of the flange portion 82 for ease of engagement of the securing portions 80 with the respective retaining elements 104. Once the second securing portion 80b of the deformable duct preform 70 is securely engaged about the receiving end portion 108 of the second retaining element 104b of the second longitudinal base member 100b, the deformable duct preform 70 is preferably deformed by bending the deformable duct preform at a middle portion 92 (see FIG. 5A) of the body portion 78 (see FIG. 5A).

FIG. 5B is an illustration of a cross-sectional side view of the deformable duct preform 70 of FIG. 5A deformed in a lateral bending direction ($d_3$) 126. As shown in FIG. 5B, the securing portion 80, such as in the form of second securing portion 80b (see FIG. 5A), of the deformable duct preform 70 is rotated about the receiving end portion 108 of the second retaining element 104b in a rotational direction ($d_2$) 125. As further shown in FIG. 5B, the deformable duct preform 70 is deformed in a lateral bending direction ($d_3$) 126 or "squeezed", so that the securing portion 80, such as in the form of first securing portion 80a (see FIG. 5A), is bent back to move the securing portions 80 close together and inside the bounds of the retaining elements 104.

The deformable duct preform 70 is then released, using pressure on the middle portion 92 (see FIG. 5A) of the deformable duct preform 70 to guide the unengaged flange portion 82 (see FIG. 5A) of the first securing portion 80a (see FIG. 5A) under the receiving end portion 108 of the first retaining element 104a (see FIG. 5C), through the gap 112 (see FIG. 5A), and between the receiving end portion 108 (see FIG. 5A) of the first retaining element 104a and the first surface 96a of the panel structure 94. The deformable duct preform 70 is then allowed to relax into an installed configuration 130 (see FIG. 5C), with the securing portion 80, such as in the form of first securing portion 80a (see FIG. 5C) rotating about the receiving end portion 108 (see FIG. 5B) of the first retaining element 104a (see FIG. 5C) in order to "self-seat" the securing portions 80 (see FIG. 5C) of the deformable duct preform 70 within the retaining elements 104 (see FIG. 5C) of the longitudinal base members 100 (see FIG. 5C).

FIG. 5C is an illustration of a cross-sectional side view of an embodiment of the air duct assembly 28 in an in-plane baseline installed configuration 130a. As used herein, "an in-plane baseline installed configuration" means the longitudinal base members 100 are in an in-plane parallel alignment 134 (see FIG. 6B), and the longitudinal base members 100 force the deformable duct preform 70 into a linear longitudinal shape 128 (see FIG. 8A) where the deformable duct preform 70 has a cross-sectional profile 138 (see FIG. 5C) in the form of a substantially circular cross-sectional profile 138a (see FIG. 5C). As shown in FIG. 5C, the in-plane baseline installed configuration 130a positions the longitudinal base members 100 and retaining elements 104 parallel to each other, oriented on the same plane, and spaced away from each other such that the deformable duct preformer 70 is forced to assume the substantially circular cross-sectional profile 138a (see FIG. 5C) and a linear longitudinal shape 128 (see FIG. 8A), when the air duct assembly 28 (see FIG. 5C) is in the installed configuration 130a (see FIG. 5C).

FIG. 5D is an illustration of a cross-sectional side view of an embodiment of the air duct assembly 28 in an in-plane displaced installed configuration 130b. As used herein, "an in-plane displaced installed configuration" means the longitudinal base members 100 are in an in-plane parallel alignment 134 (see FIG. 5D), and the longitudinal base members 100 force the deformable duct preform 70 into a linear longitudinal shape 128 (see FIG. 8A) where the deformable duct preform 70 has a cross-sectional profile 138 (see FIG. 5D) in the form of a substantially oval cross-sectional profile 138b. With the in-plane displaced installed configuration 130b, the longitudinal base members 100 are preferably spaced a greater distance apart from each other, as compared to a spacing of the longitudinal base members 100 having the in-plane baseline installed configuration 130a. For example, as shown in FIG. 5D, the second retaining element 104b is spaced farther from the first retaining element 104a, as compared to a spacing of the first retaining element 104a (see FIG. 5C) and the second retaining element 104b (see FIG. 5C) in the in-plane baseline installed configuration 130a (see FIG. 5C). As shown in FIG. 5D, assuming a constant-width air duct assembly 28 (same "arc-length"), the deformable duct preform 70 is forced to "flatten out" and take on a lower-profile shape, such as in the form of the substantially oval cross-sectional profile 138b. The shape adaptability of the deformable duct preform 70 may be useful for integration situations where the usable space is at a premium at different points along the installation of the air duct assembly 28.

FIG. 5E is an illustration of a cross-sectional side view of an embodiment of the air duct assembly 28 in an out-of-plane displaced installed configuration 130c. As used herein, "out of-plane displaced installed configuration" means the longitudinal base members 100 are in an out-of-plane non-parallel alignment 136 (see FIG. 7A), and the longitudinal base members 100 force the deformable duct preform 70 into a non-linear longitudinal shape 142 (see FIG. 7E) where the deformable duct preform 70 has a cross-sectional profile 138 (see FIG. 5E) in the form of an out-of-plane deformed cross-sectional profile 138c (see FIG. 5E). With the out-of-plane displaced installed configuration 130c, the longitudinal base members 100 are preferably spaced a greater distance apart from each other, similar to how the longitudinal base members 100 are spaced in the in-plane displaced installed configuration 130b, and as compared to a spacing of the longitudinal base members 100 having the in-plane baseline installed configuration 130a. However, with the out-of-plane displaced installed configuration 130c, the longitudinal base members 100 are not installed in the same plane as compared to the longitudinal base members 100 in the in-plane baseline installed configuration 130a (see FIG. 5C) and in the in-plane displaced installed configuration 130b (see FIG. 5D). For example, as shown in FIG. 5E, the second retaining element 104b is forced to rotate out-of-plane or "off-plane" in a different plane than the first retaining element 104a by a natural change in shape of the panel structure 94. As shown in FIG. 5D, assuming a constant-width air duct assembly 28, the deformable duct preform 70 may be forced to adapt and take on a cross-sectional profile 138 (see FIG. 5E) that meets the constraints of the retaining elements 104, such as the first retaining element 104a and the second retaining element 104b. The shape adaptability of the deformable duct preform 70 may be useful for integration situations where the panel structure 94 has a complex surface shape 140 (see FIGS. 7F, 7G) and the deformable duct preform 70 may need to conform to the complex surface shape 140 of the panel structure 94.

FIG. 5F is an illustration of an enlarged cross-sectional partial side view of the securing portion 80 of the deformable duct preform 70 engaged with the retaining element 104 of the longitudinal base member 100 in the installed configuration 130. The securing portion 80 has a hook-shaped configuration 90 (see FIG. 5F), the receiving end portion 108 comprises a bulb-shaped pivot portion 109 (see FIG. 5F), and the arm portion 110 supports the receiving end portion 108. As further shown in FIG. 5F, a gap 112 between the receiving end portion 108 and the panel structure 94 is configured to receive the flange portion 82 of the securing portion 80. The gap 112 has a thickness 114 (see FIG. 5F). As further shown in FIG. 5F, in the installed configuration 130, the first side 84a of the flange portion 82 is partially adjacent to the receiving end portion 108, and the second side 84b of the flange portion 82 is mostly adjacent to the panel structure 94. The flange portion 82 has a thickness 116. As shown in FIG. 5F, preferably, the thickness 114 of the gap 112 is slightly greater than the thickness 116 (see FIG. 5F) of the flange portion 82, to allow the flange portion 82 to move easily back and forth between the receiving end portion 108 and the panel structure 94 for ease of engagement of the securing portion 80 to the retaining element 104, when the deformable duct preform 70 is attached to the longitudinal base members 100.

FIG. 5F further shows arrows 122 depicting air pressure constrained within the deformable duct preform 70 that produces load to compress the radius portion 86 of the securing portion 80 of the deformable duct preform 70 against the receiving end portion 108 of the retaining element 104 of the longitudinal base member 100. Any minimal amount of air that may leak past the flange portion 82 may be constrained within the open area formed between the arm portion 110 and the panel structure 94.

Figure 6A:
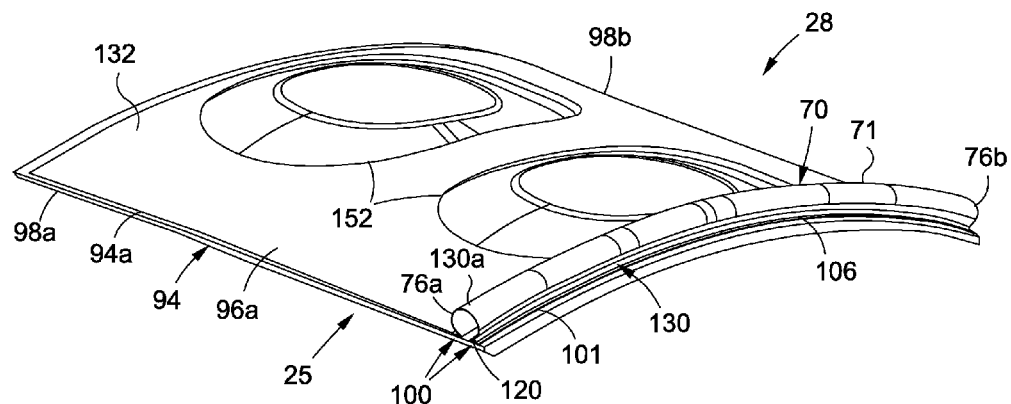
FIG. 6A is an illustration of a perspective side view of an embodiment of an air duct assembly of the disclosure in an in-plane baseline installed configuration in a lining panel.

FIG. 6A is an illustration of a perspective side view of an embodiment of an air duct assembly 28 of the disclosure having an installed configuration 130 in the form of an in-plane baseline installed configuration 130*a* and installed in a structure 25, such as an interior lining sidewall window panel 132, having windows 152. As shown in FIG. 6A, the deformable duct preform 70, such as in the form of sheet 71, having a first end 76*a* and a second end 76*b*, is attached to the longitudinal base members 100, such as in the form of longitudinal tracks 101, each longitudinal base member 100 having a longitudinal edge 106. The deformable duct preform 70 is mounted on the panel structure 94, such as lining panel 94*a*, having a first surface 96*a*, a first end 98*a*, and a second end 98*b*, and the air duct assembly 28 is integrated with the interior lining sidewall window panel 132. Thus, the air duct assembly 28 is preferably lining panel mounted, rather than air vehicle or aircraft airframe structure mounted.

Figure 6B:
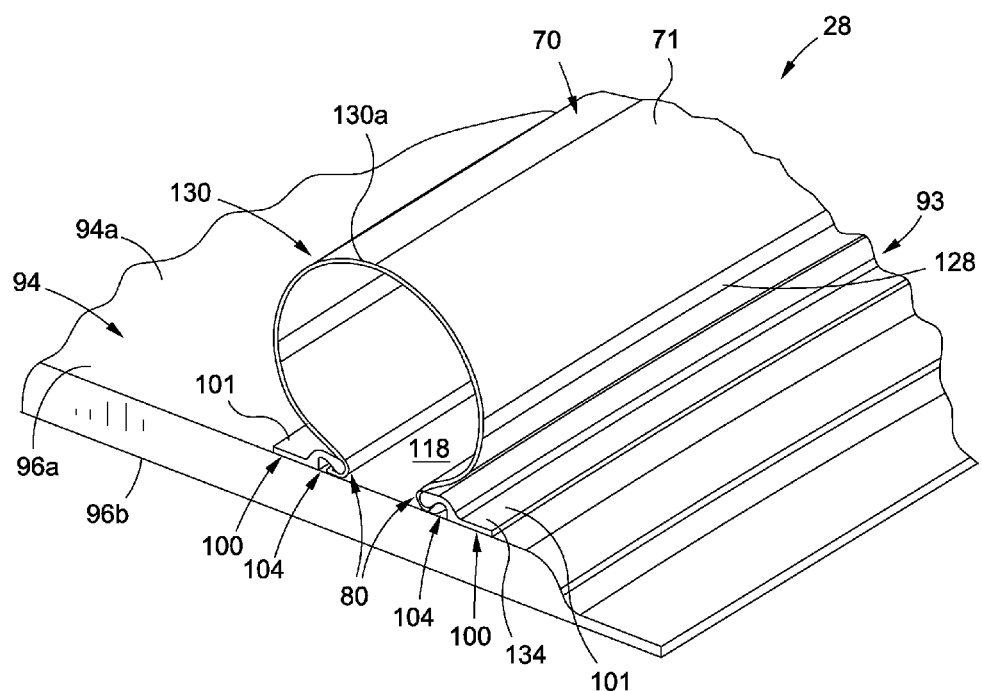
FIG. 6B is an illustration of an enlarged partial perspective end view of the air duct assembly of FIG. 6A.

FIG. 6B is an illustration of an enlarged partial perspective end view of the air duct assembly 28 of FIG. 6A in the installed configuration 130 in the form of the in-plane baseline installed configuration 130*a*. As shown in FIG. 6B, the securing portions 80 of the deformable duct preform 70, such as in the form of sheet 71, are retained by the retaining elements 104 of the longitudinal base members 100, such as in the form of longitudinal tracks 101, of the mounting base 93. The longitudinal base members 100 are preferably mounted to the first surface 96*a* of the panel structure 94, such as the lining panel 94*a*, in an in-plane parallel alignment 134. The longitudinal base members 100 force the deformable duct preform 70 into a linear longitudinal shape 128 (see FIG. 6B) where the deformable duct preform 70 has a cross-sectional profile 138 (see FIG. 5C) in the form of a substantially circular cross-sectional profile 138*a* (see FIG. 5C).

As further shown in FIG. 6B, a portion of the first surface 96*a* of the panel structure 94 bounded by the deformable duct preform 70 forms a sealing wall 118 of the deformable duct preform 70, when the deformable duct preform 70 is fully installed and mounted to the mounting base 93 to obtain the air duct assembly 28. By use of the first surface 96*a* of the panel structure 94 as the sealing wall 118, or "fourth wall", of the deformable duct preform 70, an overall weight of the air duct assembly 28 may be reduced as compared to an existing air duct assembly having a closed curve air duct.

FIGS. 7A-7G show various illustrations of the air duct assembly 28 (see FIG. 7B) where the deformable duct preform 70 may be driven by the longitudinal base members 100 (see FIG. 7B) to deform and adapt to a complex surface shape 140 (see FIGS. 7A, 7F) of the panel structure 94 (see FIGS. 7A, 7F). FIG. 7A is an illustration of a perspective side view of an embodiment of a pair of longitudinal base members 100 in the form of longitudinal tracks 101 mounted to a panel structure 94, such as a lining panel 94*a*, having a complex surface shape 140. FIG. 7A shows only the longitudinal tracks 100 and does not show the deformable duct preform 70. As shown in FIG. 7A, the longitudinal base members 100, such as in the form of longitudinal tracks 100, are mounted to the panel structure 94, such as the lining panel 94*a*, in an opposed, spaced predetermined relationship 102. As further shown in FIG. 7A, the longitudinal base members 100, such as in the form of longitudinal tracks 101, have a portion where the longitudinal base members 100 are in an out-of-plane non-parallel alignment 136. Further, as shown in FIG. 7A, the longitudinal base members 100 have longitudinal edges 106, such as in the form of first longitudinal edge 106*a* and second longitudinal edge 106*b*.

FIG. 7B is an illustration of a perspective side view of an embodiment of the air duct assembly 28 of the disclosure comprising the deformable duct preform 70, such as in the form of sheet 71, installed in the mounting base 93. The mounting base 93 comprises the pair of longitudinal base members 100 of FIG. 7A mounted to the panel structure 94, such as in the form of lining panel 94*a*. As shown in FIG. 7B, the deformable duct preform 70 may be driven by the out-of-plane non-parallel alignment 136 (see FIG. 7A) of the longitudinal base members 100, such as in the form of longitudinal tracks 101, and the retaining elements 104 (see FIG. 7F), to change a cross-sectional profile 138 (see FIG. 5E) (reducing the height of the deformed deformable duct preform 70) of the deformable duct preform 70, and to deform and adapt to the complex surface shape 140 of the panel structure 94. As shown in FIG. 7B, the air duct assembly 28 may include one or more installed configurations 130, including the in-plane baseline installed configuration 130*a* near the first end 76*a* of the deformable duct preform 70, and the out-of-plane displaced installed configuration 130*c* near the second end 76*b* of the deformable duct preform 70.

As discussed above, FIG. 7C is an illustration of an end elevation view of the air duct assembly 28 of FIG. 7B showing the length (L1) 148 of the deformable duct preform 70 and the length (L2) 150 of the longitudinal base member 100. As shown in FIG. 7C, the length 148 (L1) of the deformable duct preform 70 is preferably equal to or substantially equal to the length 150 (L2) of the longitudinal base member 100.

FIG. 7D is an illustration of a side elevation view of an embodiment of an air duct assembly 28, such as an environmental control system conditioned-air duct assembly 29, installed adjacent to windows 152 in the panel structure 94, such as the lining panel 94*a*, and integrated in the structure 25, such as the interior lining sidewall window panel 132 (see FIG. 6A). As shown in FIG. 7D, the air duct assembly 28 comprises the deformable duct preform 70, such as in the form of sheet 71, attached to the longitudinal base members 100, such as in the form of longitudinal tracks 101. As further shown in FIG. 7D, the air duct assembly 28 preferably has an interface portion 153 that interfaces with air vehicle structure-mounted ducting (not shown), receiving airflow from an air conditioning pack (not shown) of an environmental control system (not shown) of the air vehicle 10 (see FIG. 1). As further shown in FIG. 7D, the air duct assembly 28 may include one or more installed configurations 130, including the in-plane baseline installed configuration 130*a*, the in-plane displaced installed configuration 130*b*, and the out-of-plane displaced installed configuration 130*c*. In this embodiment of the air duct assembly 28, as shown in FIG. 7D, the longitudinal base members 100 force the deformable duct preform 70 into a non-linear longitudinal shape 142 along the window 152, and the deformable duct preform 70 is adaptable in a cross-sectional profile 138 (see FIGS. 5C-5E) in relation to variations 124 in attachment of the deformable duct preform 70 to the longitudinal base members 100.

FIG. 7E is an illustration of a side perspective view of the air duct assembly 28 of FIG. 7D, such as the environmental control system conditioned-air duct assembly 29, installed adjacent to windows 152 in the panel structure 94, such as the lining panel 94*a*, and integrated in the structure 25, such as the interior lining sidewall window panel 132 (see FIG. 6A). As shown in FIG. 7E, the air duct assembly 28 comprises the deformable duct preform 70, such as in the form of sheet 71, attached to the longitudinal base members 100, such as in the form of longitudinal tracks 101. As further shown in FIG. 7E, the air duct assembly 28 may include one or more installed configurations 130, including the in-plane baseline installed configuration 130*a*, the in-plane displaced installed configuration 130*b*, and the out-of-plane displaced installed configuration 130*c*. In this embodiment of the air duct assembly 28, as shown in FIG. 7E, the longitudinal base members 100 force the deformable duct preform 70 into the non-linear longitudinal shape 142 along the window 152, and the deformable duct preform 70 is adaptable in a cross-sectional profile 138 (see FIGS. 5C-5E) in relation to variations 124 in attachment of the deformable duct preform 70 to the longitudinal base members 100.

FIG. 7F is an illustration of an enlarged, perspective, partial top view of the air duct assembly 28 of FIG. 7E. As shown in FIG. 7F, the longitudinal base members 100, such as in the form of longitudinal tracks 101, may initially have an in-plane parallel alignment 136 which may then change to an out-of-plane non-parallel alignment 136 along the deformable duct preform 70, such as in the form of sheet 71. As shown in FIG. 7F, the deformable duct preform 70 may be driven by the out-of-plane non-parallel alignment 136 of the longitudinal base members 100 and the retaining elements 104 to change the cross-sectional profile 138 (see FIG. 5E) (reducing a height of the deformable duct preform 70 when deformed) of the deformable duct preform 70, and to deform and adapt to the complex surface shape 140 of the panel structure 94. As further shown in FIG. 7F, the air duct assembly 28 includes one or more the installed configurations 130 including the in-plane baseline installed configuration 130a and the in-plane displaced installed configuration 130b. In this embodiment of the air duct assembly 28, as shown in FIG. 7F, the longitudinal base members 100 force the deformable duct preform 70 into the non-linear longitudinal shape 142.

Figure 7G:
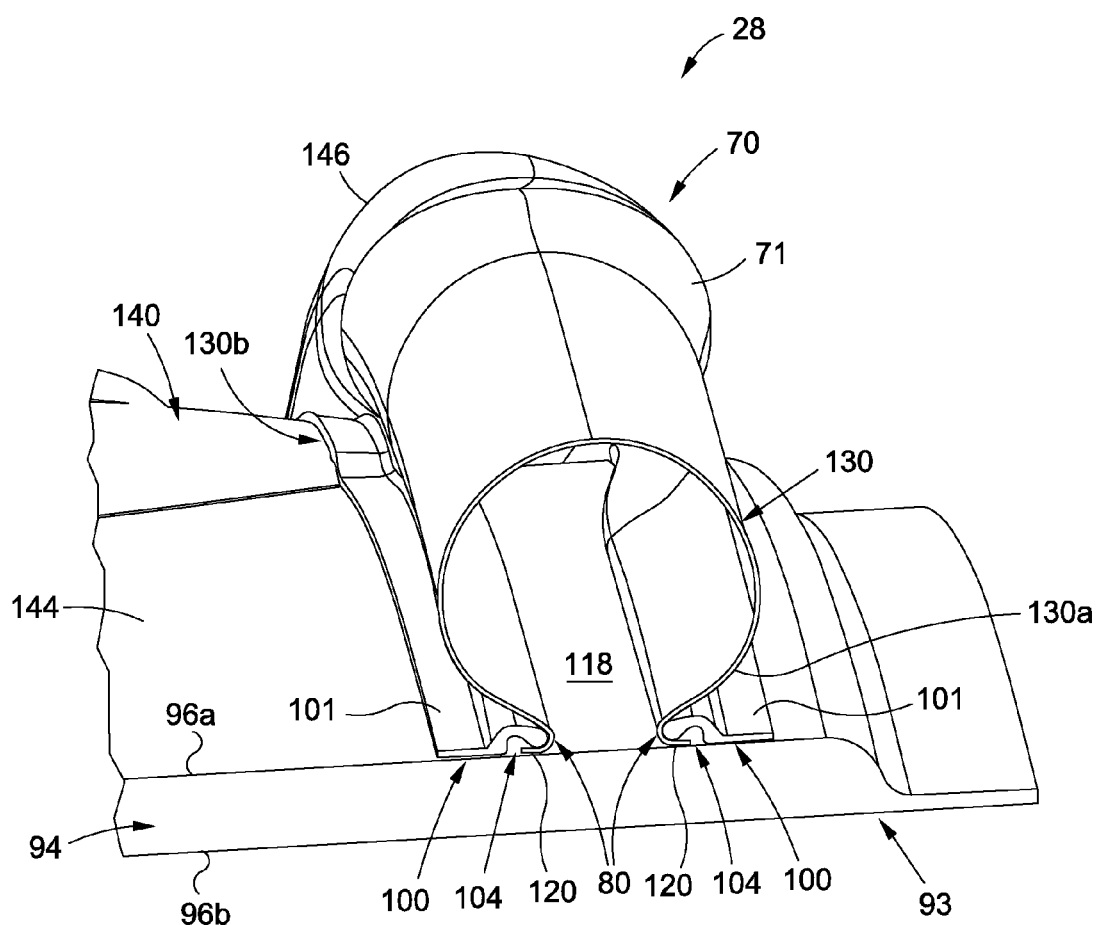
FIG. 7G is an illustration of an enlarged perspective top view of the air duct assembly of FIG. 7E.

FIG. 7G is an illustration of an enlarged perspective top view of the air duct assembly 28 of FIG. 7E. As shown in FIG. 7G, the securing portions 80 of the deformable duct preform 70, such as in the form of sheet 71, are engaged with the retaining elements 104 of the longitudinal base members 100, such as in the form of longitudinal tracks 101 to form an air-leak resistant seal 120. As further shown in FIG. 7G, a portion of the first surface 96a of the panel structure 94 bounded by the deformable duct preform 70 forms the sealing wall 118 of the deformable duct preform 70, when the deformable duct preform 70 is fully installed and mounted to the mounting base 93 to obtain the air duct assembly 28. As further shown in FIG. 7G, the air duct assembly 28 includes one or more installed configurations 130 including the in-plane baseline installed configuration 130a and the in-plane displaced installed configuration 130b. As further shown in FIG. 7G, the air duct assembly 28 is installed on a panel structure 94 having a complex surface shape 140 such as a curved surface shape 144, and this can result in the air duct assembly 28 having a changing profile shape 146 along its longitudinal travel.

Figure 8A:
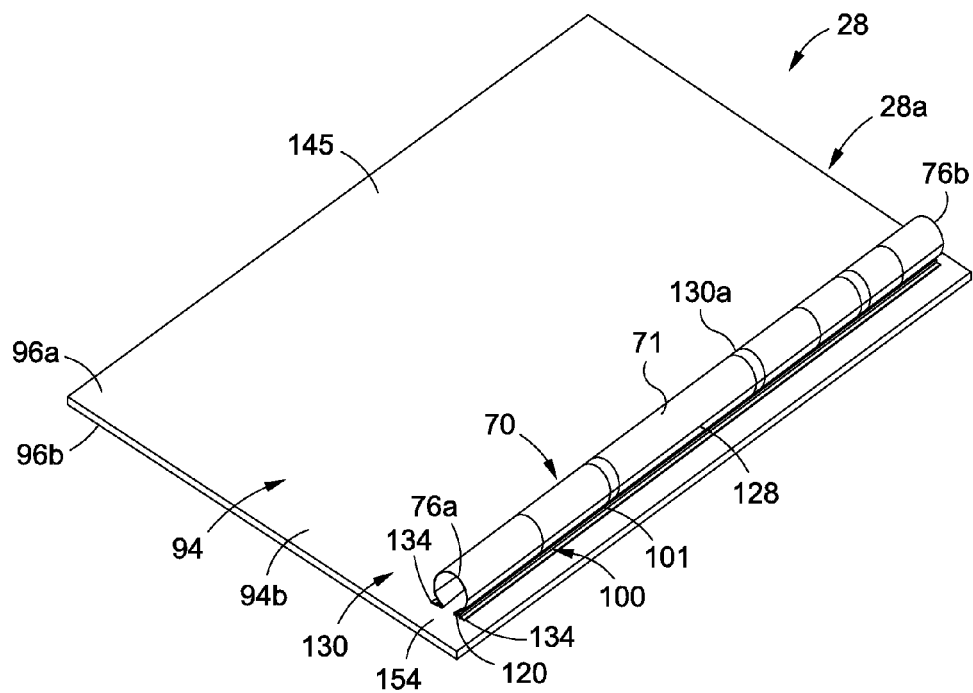
FIG. 8A is an illustration of a perspective top view of another embodiment of an air duct assembly installed on a ceiling panel having a flat surface shape.

FIG. 8A is an illustration of a perspective top view of another embodiment of an air duct assembly 28, such as in the form of air duct assembly 28a, installed on a panel structure 94 in the form of a ceiling panel 94b having a flat surface shape 145, and having a first surface 96a and a second surface 96b. As shown in FIG. 8A, the air duct assembly 28, such as in the form of air duct assembly 28a, comprises the deformable duct preform 70, such as in the form of sheet 71, having a first end 76a, a second end 76b, and a linear longitudinal shape 128. As further shown in FIG. 8A, the deformable duct preform 70 is retained by the longitudinal base members 100, such as in the form of longitudinal tracks 101, and forms an air-leak resistant seal 120. As further shown in FIG. 8A, the longitudinal base members 100 are preferably mounted to the first surface 96a of the ceiling panel 94b in an in-plane parallel alignment 134. The air duct assembly 28, such as in the form of air duct assembly 28a, has an in-plane baseline installed configuration 130a (see FIG. 8A).

Figure 8B:
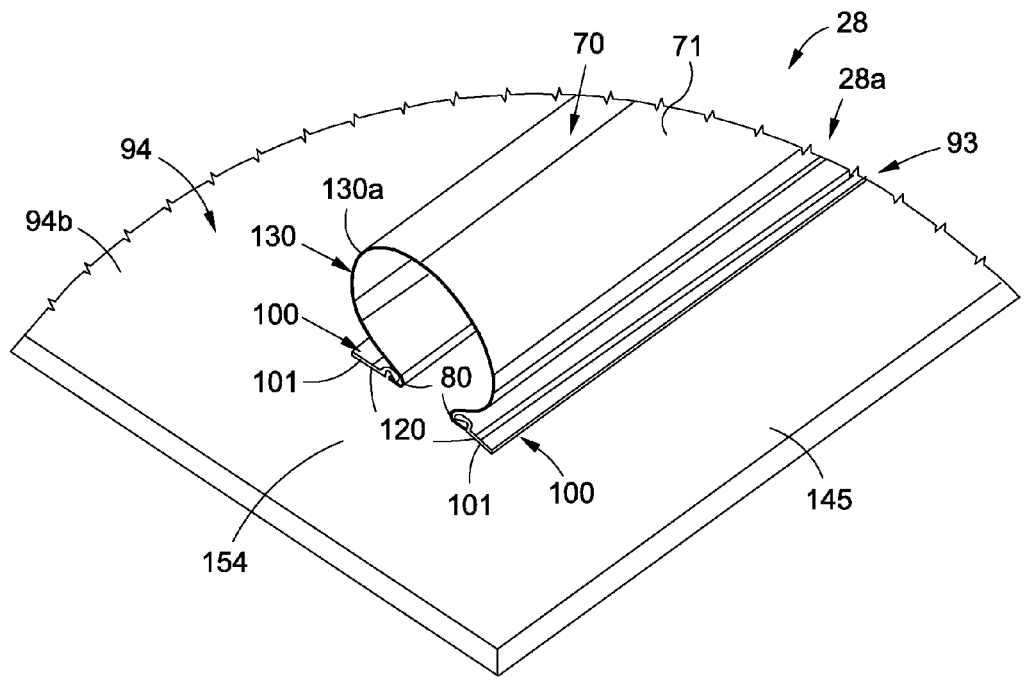
FIG. 8B is an illustration of an enlarged, perspective, partial top view of the air duct assembly of FIG. 8A.

FIG. 8B is an illustration of an enlarged, perspective, partial top view of the air duct assembly 28, such as in the form of air duct assembly 28a, of FIG. 8A. As shown in FIG. 8B, the air duct assembly 28, such as in the form of air duct assembly 28a, is installed on the panel structure 94, such as in the form of ceiling panel 94b having the flat surface shape 145, at a spaced distance 154 from the end of the panel structure 94. The securing portions 80 of the deformable duct preform 70 are retained by the longitudinal base members 100, such as in the form of longitudinal tracks 101, to form an air-leak resistant seal 120.

Figure 9:
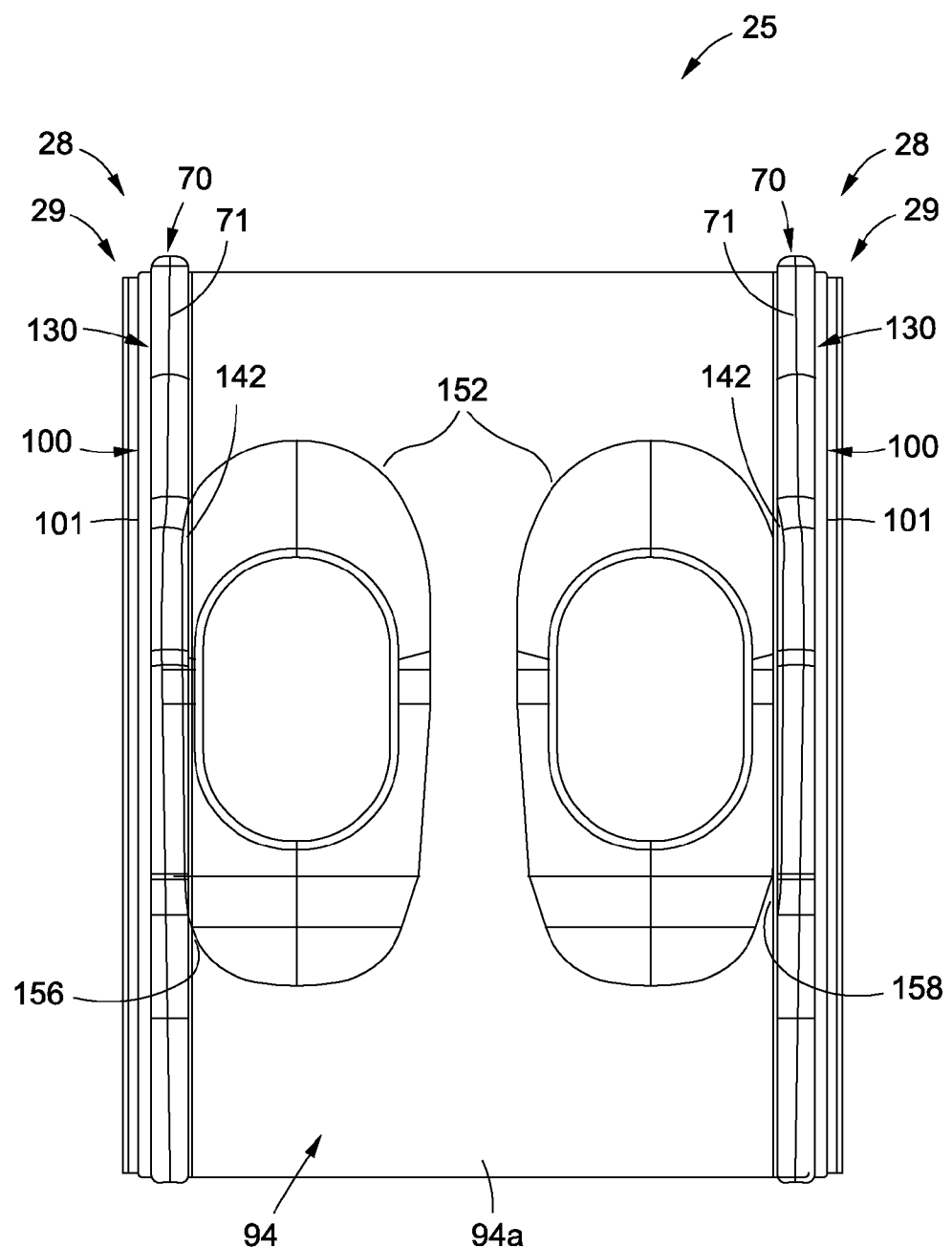
FIG. 9 is an illustration of a side elevation view of embodiments of two air duct assemblies of the disclosure installed adjacent to windows in a lining panel.

Preferably, a plurality of air duct assemblies 28, such as in the form of environmental control system conditioned-air duct assemblies 29 (see FIG. 1), may be installed and integrated in the structure 25 (see FIG. 1). FIG. 9 is an illustration of a side elevation view of a panel structure 94, such as in the form of lining panel 94a, having two air duct assemblies 28, such as in the form of environmental control system conditioned-air duct assemblies 29, in the installed configuration 130 installed adjacent to windows 152. In another embodiment, four air duct assemblies 28 may be installed on one panel structure 94, such as in the form of one lining panel 94a. As shown in FIG. 9, one of the air duct assemblies 28 may be installed at a first installation position 156 adjacent one window 152, and another one of the air duct assemblies 28, may be installed at a second installation position 158 adjacent another window 152 in the panel structure 94, such as the lining panel 94a, and integrated in the structure 25, such as, for example, the interior lining sidewall window panel 132 (see FIG. 6A).

Figure 10:
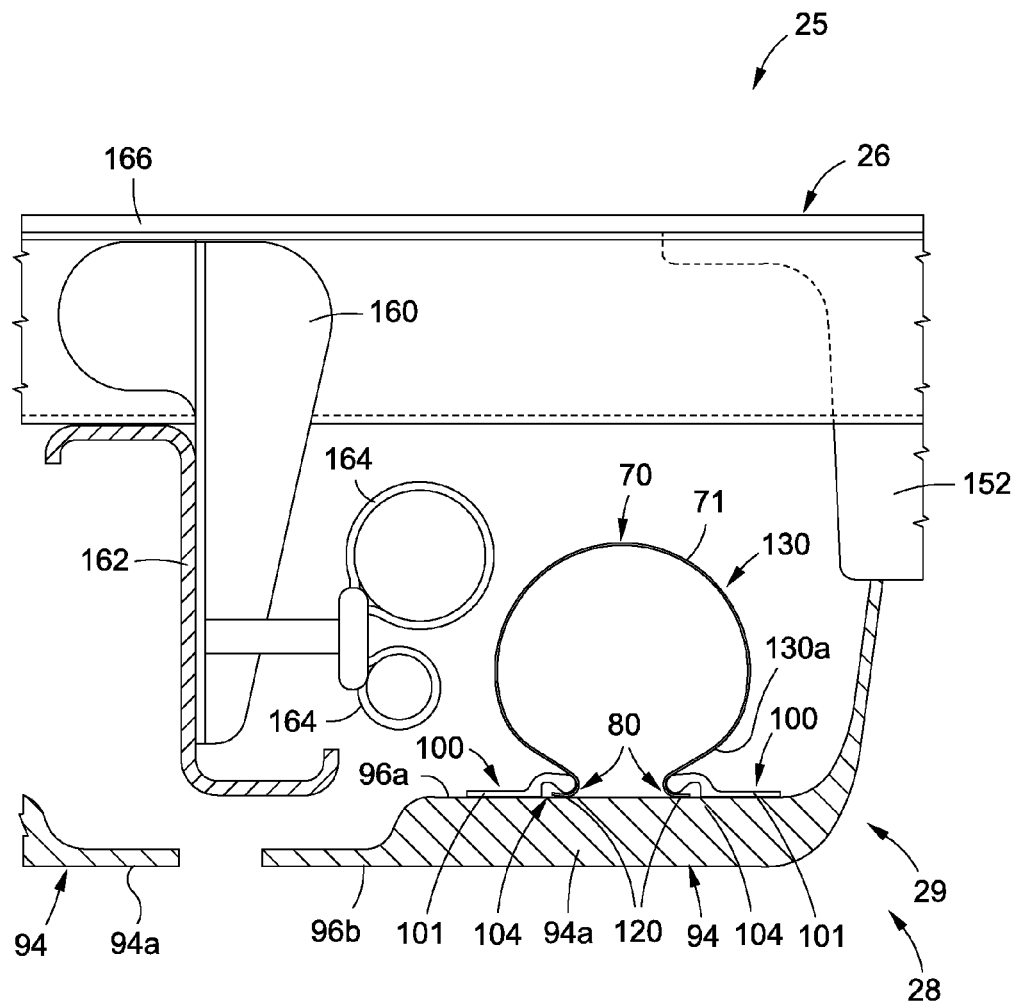
FIG. 10 is an illustration of a partial cross-sectional top view of an embodiment of an air duct assembly in an in-plane baseline installed configuration installed in an airframe; and, FIG. 11 is an illustration of a flow diagram of an exemplary embodiment of a method of the disclosure.

FIG. 10 is an illustration of a partial cross-sectional top view of an embodiment of an air duct assembly 28, such as in the form of environmental control system conditioned-air duct assembly 29, in the installed configuration 130, such as in the form of the in-plane baseline installed configuration 130a, in a structure 25, preferably a structure 25 in an air vehicle 10 (see FIG. 1). As shown in FIG. 10, the securing portions 80 of the deformable duct preform 70, such as in the form of sheet 71, are retained by the retaining elements 104 of the longitudinal base members 100, such as in the form of longitudinal tracks 101, to form an air-leak resistant seal 120. As further shown in FIG. 10, the longitudinal base members 100 are mounted to the first surface 96a of the panel structure 94, such as the lining panel 94a, in an in-plane parallel alignment 134 (see FIG. 5C). As further shown in FIG. 10, the air duct assembly 28 in the in-plane baseline installed configuration 130a is shown mounted on the panel structure 94, and the panel structure 94 is adjacent a window 152. As further shown in FIG. 10, the structure 25 comprises the airframe 26 which may include stringers or other aircraft structural elements, a structural clip 160 such as a stringer clip, a structural frame element 162, wiring elements 164 such as standoff and wiring bundles, and a skin panel 166. Insulation blankets (not shown) may also be included in the structure 25.

In another embodiment of the disclosure, there is provided an air vehicle 10 (see FIG. 1). The air vehicle 100 comprises an airframe 26 (see FIG. 1). The air vehicle 10 further comprises a plurality of environmental control system conditioned air duct assemblies 29 (see FIGS. 1, 7D) attached to lining panels 94a (see FIG. 7D) and ceiling panels 94b (see FIG. 8A) within the airframe 26. Each air duct assembly 28 comprises a deformable duct sheet 71 (see FIG. 4A) having securing portions 80 (see FIG. 4A) formed along opposing longitudinal edges 74 (see FIG. 4A) of the deformable duct sheet 71. As discussed above, each securing portion 80 (see FIG. 4C) has a flange portion 82 (see FIG. 4C) and a radius portion 86 (see FIG. 4C).

Each air duct assembly 28 further comprises a mounting base 93 (see FIG. 4B) to which the deformable duct sheet 71 is mounted to or attached to. The mounting base 93 (see FIG. 4B) comprises a panel structure 94 (see FIG. 4B) having a pair of longitudinal base members 100 (see FIG. 4B) mounted thereon in an opposed, spaced predetermined relationship 102 (see FIG. 4B). The panel structure 94 (see FIG. 4B) preferably has a surface portion 97 (see FIG. 4B) that forms a sealing wall 118 (see FIG. 4C) of the deformable duct sheet 71 (see FIG. 4C) when the deformable duct sheet 71 is attached to the longitudinal base members 100 (see FIG. 4C). This may result in a reduced overall weight of the air duct assembly 28 as compared to an existing air duct assembly having a closed curve air duct. The panel structure 94 may comprise a lining panel 94*a* (see FIG. 7E) and a ceiling panel 94*b* (see FIG. 8A).

Each longitudinal track base member (see FIG. 4B) has a retaining element 104 (see FIG. 4B) formed along or added along a longitudinal edge 106 (see FIG. 4B) of the longitudinal base member 100. Each retaining element 104 is preconfigured to engage the flange portion 82 and the radius portion 86 of each securing portion 80 to attach the deformable duct sheet 71 to the longitudinal base members 100 and to form an air-leak resistant seal 120 (see FIG. 4C). The deformable duct sheet 71 is preferably adaptable in a cross-sectional profile 138 (see FIGS. 5C-5E) in relation to variations 124 (see FIG. 7E) in attachment of the deformable duct sheet 71 (see FIG. 7E) to the longitudinal base members 100 (see FIG. 7E).

The air duct assembly 28 (see FIG. 4C) preferably has an installed configuration 130 (see FIG. 4C). As discussed above, the installed configuration 130 may consist of one or more of an in-plane baseline installed configuration 130*a* (see FIG. 5C), an in-plane displaced installed configuration 130*b* (see FIG. 5D), an out-of-plane displaced installed configuration 130*c* (see FIG. 5E), or another suitable installed configuration.

Figure 11:
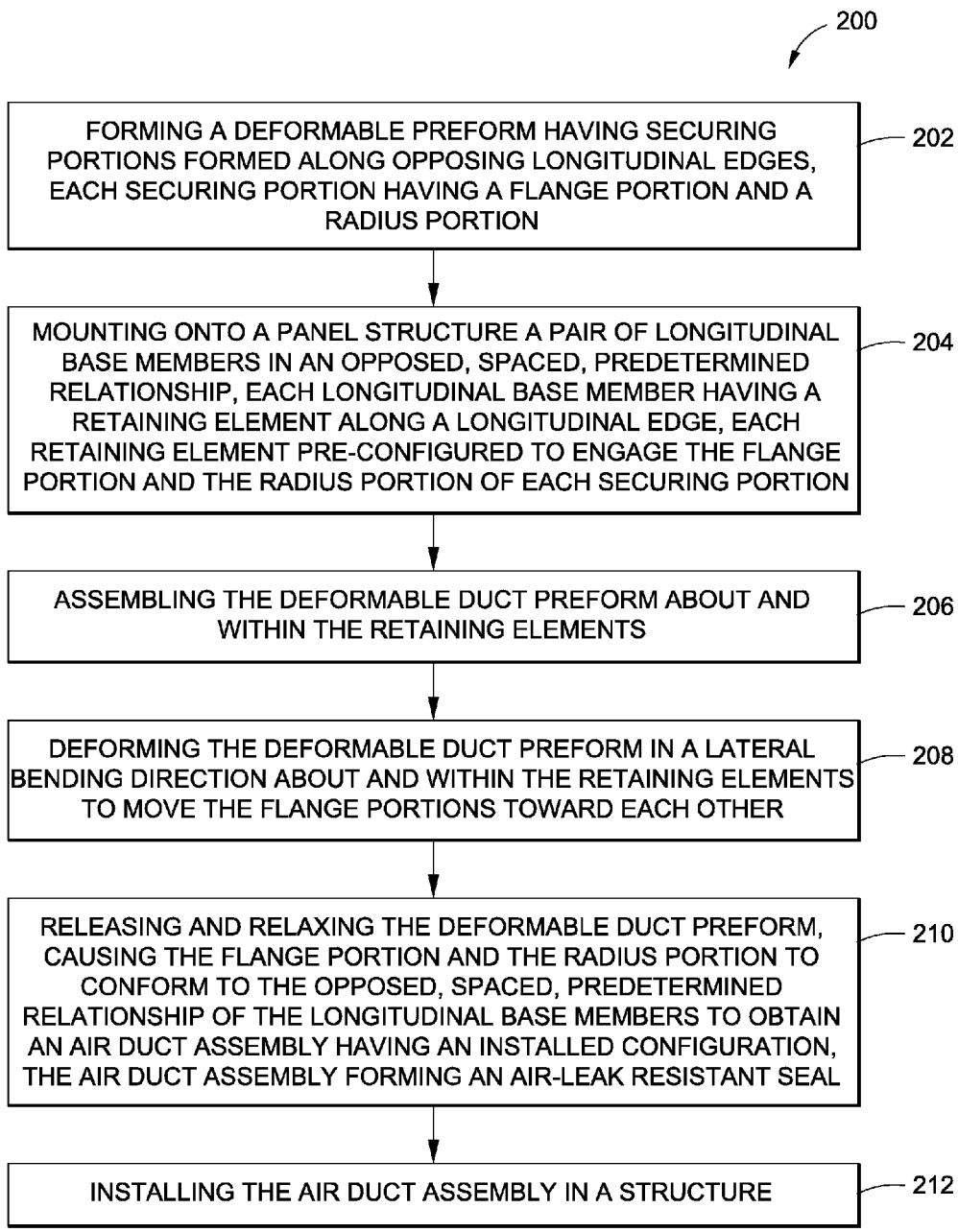

In another embodiment of the disclosure, there is provided method 200 of installing an air duct assembly 28 in a structure 25 (see FIG. 1). FIG. 11 is an illustration of a flow diagram of an exemplary embodiment of the method 200 of the disclosure. As shown in FIG. 11, the method 200 comprises step 202 of forming a deformable duct preform 70 (see FIG. 4A) having securing portions 80 (see FIG. 4A) formed along opposing longitudinal edges 74 (see FIG. 4A). Each securing portion 80 (see FIG. 4C) has a flange portion 82 (see FIG. 4C) and a radius portion 86 (see FIG. 4C). The deformable duct preform 70 is preferably adaptable in a cross-sectional profile 138 (see FIGS. 5C-5E) in relation to variations 124 (see FIG. 7E) in attachment of the deformable duct preform 70 (see FIG. 7E) to the longitudinal base members 100 (see FIG. 7E).

As shown in FIG. 11, the method 200 further comprises step 204 of mounting onto a panel structure 94 (see FIG. 4B) a pair of longitudinal base members 100 (see FIG. 4B) in an opposed, spaced, predetermined relationship 102 (see FIG. 4B). Each longitudinal base member 100 has a retaining element 104 (see FIG. 4B) along a longitudinal edge 106 (see FIG. 4B). Each retaining element 104 is preferably pre-configured to engage the flange portion 82 (see FIG. 4C) and the radius portion 86 (see FIG. 4C) of each securing portion 80 (see FIG. 4C). The mounting step 204 may further comprise mounting the longitudinal base members 100 onto the panel structure 94, where the panel structure 94 comprises one of a lining panel 94*a* (see FIG. 7D) for an air vehicle 10 (see FIG. 1), a ceiling panel 94*b* (see FIG. 8A) for an air vehicle 10 (see FIG. 1), a lining panel or a ceiling panel for a watercraft (not shown), a lining panel or a ceiling panel for a train (not shown), or another suitable panel structure. The mounting step 204 may further comprise forming a gap 112 (see FIG. 5A) between a receiving end portion 108 (see FIG. 5A) of each retaining element 104 (see FIG. 5A) and a first surface 96*a* (see FIG. 5A) of the panel structure 94 (or a surface portion 97 (see FIG. 4B) of the panel structure 94), and allowing the flange portion 82 (see FIG. 5A) to fit snugly in the gap 112 (see FIG. 5A) between the receiving end portion 108 (see FIG. 5A) and the first surface 96*a* (see FIG. 5A) (or the surface portion 97 (see FIG. 4B)) of the panel structure 94.

As shown in FIG. 11, the method 200 further comprises step 206 of assembling the deformable duct preform 70 (see FIG. 5A) about and within the retaining elements 104 (see FIG. 5A) of the longitudinal base members 100 (see FIG. 5A). As shown in FIG. 11, the method 200 further comprises step 208 of deforming the deformable duct preform 70 in a lateral bending direction 126 (see FIG. 5B) about and within the retaining elements 104 (see FIG. 5B) of the longitudinal base members 100 (see FIG. 5B) to move the flange portions 82 (see FIG. 5B) toward each other.

As shown in FIG. 11, the method 200 further comprises step 210 of releasing and relaxing the deformable duct preform 70 (see FIG. 5C), causing the flange portions 82 (see FIG. 5C) and the radius portions 86 (see FIG. 5C) to conform to the opposed, spaced, predetermined relationship 102 (see FIG. 4B) of the longitudinal base members 100 (see FIG. 5C) to obtain an air duct assembly 28 (see FIG. 5C) having an installed configuration 130 (see FIG. 5C). The air duct assembly 28 (see FIG. 5C) forms an air-leak resistant seal 120 (see FIG. 5C). The releasing and relaxing step 210 may further comprise forming a sealing wall 118 (see FIG. 4C) of the deformable duct preform 70 (see FIG. 4C) with a surface portion 97 (see FIG. 4B) of the panel structure 94 (see FIG. 4B), resulting in a reduced overall weight of the air duct assembly 28 as compared to an existing air duct assembly having a closed curve air duct.

As shown in FIG. 11, the method 200 further comprises step 212 of installing the air duct assembly 28 in a structure 25 (see FIGS. 1, 10), such as the airframe 26 of the air vehicle 10 (see FIG. 1). In particular, the air duct assembly 28 may be attached to lining panels 94*a* (see FIG. 7D) and/or ceiling panels 94*b* (see FIG. 8A) within the airframe 26 (see FIG. 1) of the air vehicle 10 (see FIG. 1).

The air duct assembly 28 (see FIG. 4C) preferably has an installed configuration 130 (see FIG. 4C). As discussed above, the installed configuration 130 may consist of one or more of an in-plane baseline installed configuration 130*a* (see FIG. 5C), an in-plane displaced installed configuration 130*b* (see FIG. 5D), an out-of-plane displaced installed configuration 130*c* (see FIG. 5E), or another suitable installed configuration. The deformable duct preform 70 is preferably driven by the retaining elements 104 to deform and adapt to a surface of the panel structure 94 when the deformable duct preform 70 is in the installed position 130 (see FIGS. 5C-5E).

As will be appreciated by those of skill in the art, incorporating the novel air duct assemblies 28 into an air vehicle 10 (see FIG. 1) or other vehicles and structures, results in a number of substantial benefits. Disclosed embodiments of the air duct assembly 28 (see FIGS. 4C and 5C-5D) and method 200 (see FIG. 11) of installing the air duct assembly 28 (see FIGS. 4C and 5C-5D) provide for lightweight, environmental control system conditioned-air ducting which is adaptable in its cross-sectional profile and shape as a result of variations 124 (see FIG. 7E) in the attachment of the longitudinal base members 100 (see FIG. 7E) to the panel structure 94 (see FIG. 7E), attachment of the deformable duct preform 70 (see FIG. 7E) to the longitudinal base members 100 (see FIG. 7E) and lateral bending direction 126 of the deformable duct preform 70 to deform and adapt the deformable duct preform 70 to a predetermined complex surface shape 140 (see FIG. 7F). The shape adaptability of the air duct assembly 28 may be useful for integration purposes where the panel structure 94, such as the lining panel 94a (see FIG. 7A), has a complex surface shape 140 (see FIG. 7A) and the air duct assembly 28, including the deformable duct preform 70, must conform to it.

In addition, disclosed embodiments of the air duct assembly 28 (see FIGS. 4C and 5C-5D) and method 200 (see FIG. 11) of installing the air duct assembly 28 (see FIGS. 4C and 5C-5D) facilitate integration of environmental control system (ECS) conditioned-air duct assemblies 29 (see FIG. 7E) in tight volume spaces, while minimizing or eliminating increases to installation time of either the environmental control system conditioned-air duct assemblies 29 (see FIG. 7E) or the lining panels 94a or the ceiling panes 94b. Moreover, by use of the installed surface portion 97 (see FIG. 4B) of the panel structure 94 (see FIG. 4B) as the sealing wall 118 (see FIG. 4C), or "fourth wall", of the deformable duct preform 70 (see FIG. 4C), an overall weight of the air duct assembly 28 may be reduced as compared to an existing air duct assembly having a closed curve air duct. Thus, a key weight-saving feature of the air duct assembly 28 relies on the existing surface portion 97 (see FIG. 4B) of the panel structure 94 (see FIG. 4B) as its sealing wall 118 (see FIG. 4C), or "fourth wall", and the deformable duct preform 70 itself does not duplicate the surface portion 97, as an existing round, closed curve air duct would. An overall reduction in the weight of the air vehicle 10 (see FIG. 1) may allow the air vehicle 10 to carry more fuel, thus extending the flight range. In addition to weight savings, the air duct assembly 28 preferably has a reduced overall height, as compared to an existing or known round, closed-curve air duct, due to no duplication of the surface portion 97 (see FIG. 4B) with the air duct assembly 28 disclosed herein, while the air duct assembly 28 may still maintain a substantially equivalent air flow volume capacity, as compared to an existing or known round, closed-curve air duct. Having a reduced overall height may facilitate the routing of the air duct assembly 28 through challenging integration areas.

Further, disclosed embodiments of the air duct assembly 28 (see FIGS. 4C and 5C-5D) and method 200 (see FIG. 11) of installing the air duct assembly 28 (see FIGS. 4C and 5C-5D) provide for rapid installation and removal; do not require expensive special tooling and production processes to manufacture and install and do not require the use of fasteners or small hardware, such as clamps, threaded inserts, or other small hardware, that existing or known air duct systems may require; deform to needed shapes upon installation on the mounting base 93 (see FIG. 4B) by means of tailored placement of the longitudinal base members 100 (see FIG. 4B) on the panel structure 94 (see FIG. 4B); facilitate the distribution of airflow into multiple, smaller ducts that will not require deletion of windows in an air vehicle 10 (see FIG. 1); and provide for an air-leak resistant seal 120 (see FIG. 5C) when the air duct assembly 28 is in the installed configuration 130 (see FIG. 5C). In addition, disclosed embodiments of the air duct assembly 28 (see FIGS. 4C and 5C-5D) and method 200 (see FIG. 11) of installing the air duct assembly 28 (see FIGS. 4C and 5C-5D) provide for mounting directly on panel structures 94 (see FIG. 4B) such as lining panels 94a (see FIG. 7E), and/or ceiling panels 94b (see FIG. 8A), rather than aircraft airframe mounting, and mitigates the integration challenge by moving the portion of the air duct co-incident with the interior panel lining sidewall window panel from being aircraft-mounted to being integrated with the panel structure 94, such as the lining panel 94a (see FIG. 7D) or the ceiling panel 94b (see FIG. 8A). The shape of the air duct assembly 28 (see FIGS. 6A, 9) may be adapted as necessary to conform to the available integration volume.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An air duct assembly comprising:
   a deformable duct preform having securing portions formed along opposing longitudinal edges of the deformable duct preform, each securing portion having a hook-shaped configuration, a flange portion with a first side and a second side, and a radius portion; and,
   a panel structure having a pair of longitudinal base members mounted thereon in an opposed, spaced, predetermined relationship, each longitudinal base member having a retaining element along a longitudinal edge of the longitudinal base member, each retaining element preconfigured to engage the flange portion and the radius portion of each securing portion to attach the deformable duct preform to the longitudinal base members and to form an air-leak resistant seal, and each retaining element comprising a receiving end portion, wherein the receiving end portions of the retaining elements of the pair of longitudinal base members directly face each other in an opposed relationship, and the first side of each flange portion is partially adjacent to each receiving end portion when the flange portion is engaged with the retaining element, and the deformable duct preform being adaptable in a cross-sectional profile in relation to variations in attachment of the deformable duct preform to the longitudinal base members.

2. The air duct assembly of claim 1 wherein the deformable duct preform comprises a sheet made of a semi-rigid, lightweight material selected from a group consisting of one of a thermoplastic material, a thermoset material, and a fiberglass material in a cured phenolic resin.

3. The air duct assembly of claim 1 wherein the panel structure has a surface portion that forms a sealing wall of the deformable duct preform when the deformable duct preform is attached to the longitudinal base members, and results in a reduced overall weight of the air duct assembly as compared to an existing air duct assembly having a closed curve air duct.

4. The air duct assembly of claim 1 wherein the receiving end portion forms a gap with a surface of the panel structure, the gap having a thickness that allows the flange portion to fit between the receiving end portion and the surface of the panel structure when the deformable duct preform is attached to the longitudinal base members.

5. The air duct assembly of claim 4 wherein the retaining element comprises an arm portion supporting the receiving end portion, the arm portion having an angled goose-neck shape, and the arm portion configured to allow the flange portion and the radius portion to rotate about the receiving end portion without interference when the deformable duct preform is attached to the longitudinal base members.

6. The air duct assembly of claim 1 wherein the flange portion is substantially parallel to a surface of the panel structure when the deformable duct preform is attached to the longitudinal base members.

7. The air duct assembly of claim 1 wherein the deformable duct preform is adaptable in the cross-sectional profile as a result of the opposed, spaced, predetermined relationship of the longitudinal base members and a lateral bending direction of the deformable duct preform about the retaining elements of the longitudinal base members when the deformable duct preform is attached to the longitudinal base members.

8. The air duct assembly of claim 1 wherein the air duct assembly has an installed configuration selected from a group consisting of one or more of an in-plane baseline installed configuration, an in-plane displaced installed configuration, and an out-of-plane displaced installed configuration.

9. The air duct assembly of claim 1 wherein the deformable duct preform has a length that is equal to a length of the pair of longitudinal base members.

10. The air duct assembly of claim 1 wherein the panel structure comprises a lining panel or a ceiling panel for a vehicle, the vehicle comprising one or more of an air vehicle, a watercraft, and a train.

11. An air vehicle comprising:
an airframe; and,
a plurality of environmental control system conditioned air duct assemblies within the airframe, each assembly comprising:
  a deformable duct sheet having securing portions formed along opposing longitudinal edges of the deformable duct sheet, each securing portion having a hook-shaped configuration, a flange portion with a first side and a second side, and a radius portion; and,
  a panel structure having a pair of longitudinal tracks mounted thereon in an opposed, spaced, predetermined relationship, each longitudinal track having a retaining element along a longitudinal edge of the longitudinal track, each retaining element pre-configured to engage the flange portion and the radius portion of each securing portion to attach the deformable duct sheet to the longitudinal tracks and to form an air-leak resistant seal, and each retaining element comprising a receiving end portion wherein the receiving end portions of the retaining elements of the pair of longitudinal tracks directly face each other in an opposed relationship, and the first side of each flange portion is partially adjacent to each receiving end portion when the flange portion is engaged with the retaining element, and the deformable duct sheet being adaptable in a cross-sectional profile in relation to variations in attachment of the deformable duct preform to the longitudinal tracks.

12. The air vehicle of claim 11 wherein the air duct assembly has an installed configuration selected from a group consisting of one or more of an in-plane baseline installed configuration, an in-plane displaced installed configuration, and an out-of-plane displaced installed configuration.

13. The air vehicle of claim 11 wherein the panel structure has a surface portion that forms a sealing wall of the deformable duct sheet when the deformable duct sheet is attached to the longitudinal tracks, and results in a reduced overall weight of the air duct assembly as compared to an existing air duct assembly having a closed curve air duct.

14. The air vehicle of claim 11 wherein the panel structure comprises one or more of a lining panel and a ceiling panel.

15. A method of installing an air duct assembly in a structure, the method comprising the steps of:
forming a deformable duct preform having securing portions formed along opposing longitudinal edges, each securing portion having a hook-shaped configuration, a flange portion with a first side and a second side, and a radius portion;

mounting onto a panel structure a pair of longitudinal base members in an opposed, spaced, predetermined relationship, each longitudinal base member having a retaining element pre-configured to engage each securing portion, and each retaining element comprising a receiving end portion, wherein the receiving end portions of the retaining elements of the pair of longitudinal base members directly face each other in an opposed relationship;

assembling the deformable duct preform about and within the retaining elements of the longitudinal base members, each retaining element engaging the flange portion and the radius portion of each securing portion, and the first side of each flange portion being partially adjacent to each receiving end portion when the flange portion is engaged with the retaining element;

deforming the deformable duct preform in a lateral direction about and within the retaining elements;

releasing and relaxing the deformable duct preform so that it conforms, to the opposed, spaced, predetermined relationship of the longitudinal base members to obtain an air duct assembly; and, installing the air duct assembly in a structure.

16. The method of claim 15 wherein the deformable duct preform is adaptable in a cross-sectional profile in relation to variations in attachment of the deformable duct preform to the longitudinal base members.

17. The method of claim 15 wherein the air duct assembly has an installed configuration selected from a group consisting of one or more of an in-plane baseline installed configuration, an in-plane displaced installed configuration, and an out-of-plane displaced installed configuration.

18. The method of claim 15 wherein the releasing and relaxing step further comprises forming a sealing wall of the deformable duct preform with a surface portion of the panel structure, resulting in a reduced overall weight of the air duct assembly as compared to an existing air duct assembly having a closed curve air duct.

19. The method of claim 15 wherein the mounting step further comprises forming a gap between the receiving end portion of each retaining element and a surface of the panel structure, and allowing the flange portion of each securing portion to fit snugly in the gap between the receiving end portion and the surface of the panel structure.

20. The method of claim 15 wherein the mounting step further comprises mounting the pair of longitudinal base members onto a lining panel or a ceiling panel for a vehicle, the vehicle comprising one or more of an air vehicle, a watercraft, and a train.

21. The method of claim 15 wherein the forming step further comprises forming the deformable duct preform of a sheet made of a semi-rigid, lightweight material selected from a group consisting of one of a thermoplastic material, a thermoset material, and a fiberglass material in a cured phenolic resin.

22. The method of claim 15 wherein the mounting step further comprises mounting each longitudinal base member having the retaining element along a longitudinal edge, each retaining element pre-configured to engage the flange portion and the radius portion of each securing portion.

23. The method of claim 15 wherein the deforming step further comprises deforming the deformable duct preform in the lateral direction about and within the retaining elements of the longitudinal base members to move the flange portions toward each other.

24. The method of claim 15 wherein the releasing and relaxing step further comprises releasing and relaxing the deformable duct preform causing the flange portion and the radius portion to conform to the opposed, spaced, predetermined relationship of the longitudinal base members to obtain the air duct assembly having an installed configuration, the air duct assembly forming an air-leak resistant seal.

* * * * *